(12) United States Patent
Pilutti et al.

(10) Patent No.: US 12,230,044 B2
(45) Date of Patent: Feb. 18, 2025

(54) SEGMENTATION-BASED IMAGE PROCESSING FOR CONFLUENCY ESTIMATION

(71) Applicant: VBC HOLDINGS LLC, Culver City, CA (US)

(72) Inventors: David Pilutti, Udine (IT); Alison Willian Gomes Dos Santos, Udine (IT); Francesco Armani, Martignacco (IT); Giacomo Cattaruzzi, Udine (IT)

(73) Assignee: VBC HOLDINGS LLC, Culver City, CA (US)

( * ) Notice: Subject to any disclaimer, the term of this patent is extended or adjusted under 35 U.S.C. 154(b) by 394 days.

(21) Appl. No.: 17/840,895

(22) Filed: Jun. 15, 2022

(65) Prior Publication Data
US 2022/0406079 A1 Dec. 22, 2022

Related U.S. Application Data

(60) Provisional application No. 63/211,964, filed on Jun. 17, 2021.

(51) Int. Cl.
*G06V 20/69* (2022.01)
*G06T 5/30* (2006.01)
(Continued)

(52) U.S. Cl.
CPC .............. *G06V 20/695* (2022.01); *G06T 5/30* (2013.01); *G06T 5/40* (2013.01); *G06T 5/70* (2024.01); *G06T 5/94* (2024.01); *G06T 7/155* (2017.01)

(58) Field of Classification Search
USPC ........................................................ 382/176
See application file for complete search history.

(56) References Cited

U.S. PATENT DOCUMENTS 10,229,342 B2    3/2019  Song et al.
2015/0324998 A1* 11/2015 Song ......................... G06T 5/40
                                                        382/171

FOREIGN PATENT DOCUMENTS

JP    2007509314 A    4/2007
JP    2014110797 A    6/2014
(Continued)

OTHER PUBLICATIONS

Firuzinia et al., "An Automatic Method for Morphological Abnormality Detection in Metaphase II Human Oocyte Images", 9th International Conference on Computer and Knowledge Engineering (ICCKE 2019), Oct. 24-25, 2019, Ferdowsi University of Mashhad (Year: 2019).*

(Continued)

*Primary Examiner* — Jacky X Zheng
(74) *Attorney, Agent, or Firm* — Harness Dickey & Pierce P.L.C.

(57) ABSTRACT

A method of determining a coverage of an image by an apparatus including processing circuitry includes executing, by the processing circuitry, instructions that cause the apparatus to generate a first segmentation mask by segmenting an image, generate a modified mask by applying a morphological operation to the first segmentation mask, generate a modified masked input based on the image and an inversion of the modified mask, generate a second segmentation mask by segmenting the modified masked input, and determine a coverage of the image based on the first segmentation mask and the second segmentation mask.

13 Claims, 18 Drawing Sheets

(51) Int. Cl.
  *G06T 5/40*  (2006.01)
  *G06T 5/70*  (2024.01)
  *G06T 5/94*  (2024.01)
  *G06T 7/155*  (2017.01)

(56) References Cited

FOREIGN PATENT DOCUMENTS

| | | |
|---|---|---|
| WO | 2005029413 A1 | 3/2005 |
| WO | 2006124651 A2 | 11/2006 |

OTHER PUBLICATIONS

Farnoosh et al., "A Framework for White Blood Cell Segmentation in Microscopic Blood Images Using Digital Image Processing", Article in Biological Procedures Online • Jul. 2009 (Year: 2009).*

Wikipedia, "Mathematical morphology," p. 1-10 (2021), retrieved from: https://en.wikipedia.org/w/index.php?title=Mathematical_morphology&oldid=1022770454.

Seiler, C., et al., "Time-lapse microscopy and classification of 2D human mesenchymal stem cells based on cell shape picks up myogenic from osteogenic and adipogenic differentiation," Journal of Tissue Engineering and Regenerative Medicine, p. 1-10 (2012).

Joshi, M.D., et al., "White Blood Cells Segmentation and Classification to Detect Acute Leukemia," International Jouranl of Emerging Trends andTechnology in Computer Sciences, 2(3): 147-151 (2013).

Bradhurst, C., et al., "Segmentation of Bone Marrow Stromal Cells in Phase Contrast Microscopy Images," Proceedings of the 2008 23rd International Conference Image and Vision Computing New Zealand, pp. 1-6 (2009).

Al-Hafiz, F., et al., "Red blood cell segmentation by thresholding and Canny detector," Procedia Computer Sciences, 141: 327-334 (2018).

Afridi, M.J., et al., "Image Segmentation of Mesenchymal Stem Cells in Diverse Culturing Conditions," IEEE Winter Conference on Applications of Computer Vision, p. 1-8 (2014).

Ali, R., et al., "Automatic segmentation of adherent biological cell boundaries and nuclei from brightfield microscopy images," Machine Vision and Applications, 1-15 (2011).

Jaccard, N., et al., "Automated Method for the Rapid and Precise Estimation of Adherent Cell Culture Characteristics from Phase Contrast Microscopy Images," Bioitechnology and Bioengineering, 111(3): 504-517 (2014).

Cepa, M., "Segmentation of Total Cell Area in Brightfield Microscopy Images," Methods and Protoc., 1(43): 1-8 (2018).

Ronneberger, O., et al., "U-Net: Convolutional Networks for Biomedical Image Segmentation," p. 1-8 (2015).

Topman, G., et al., "A Method for Quick, Low-Cost Automated Confluency Measurements," Microsc. Microanal., 17: 915-922 (2011).

Suzuki, S. and Abe, K., "Topological Structural Analysis of Digitized Binary Images by Border Following," Computer Vision, Graphics, and Image Processing, 30: 32-46 (1985).

Firuzinia, S., et al., "An Automatic Method for Morphological Abnormality Detection in Metaphase II Human Oocyte Images," 9th International Conference on Computer and Knowledge Engineering, IEEE, p. 91-97 (2019).

Sadeghian, F., et al., "A Framework for White Blood Cell Segmentation in Microscopic Blood Images Using Digital Image Processing," Biological Procedures Online, 11(1): p. 9011 (2009).

Sharif, J.M., et al., "Red Blood Cell Segmentation Using Masking and Watershed Algorithm: A Preliminary Study," Biomedical Engineering (ICOBE), p. 258-262 (2012).

International Search Report from corresponding PCT Application No. PCT/IB2022/055546 dated Oct. 18, 2022.

Written Opinion from corresponding PCT Application No. PCT/IB2022/055546 dated Oct. 18, 2022.

Office Action from corresponding JP Application No. 2023-577553 dated Aug. 20, 2024.

* cited by examiner

LOW-CONFLUENCE
CELL CULTURE

MID-CONFLUENCE
CELL CULTURE

HIGH-CONFLUENCE
CELL CULTURE

IMAGE FEATURE ADJUSTMENT:
LOCAL CONTRAST ENHANCEMENT

SEGMENTATION-BASED IMAGE PROCESSING FOR CONFLUENCY ESTIMATION

CROSS REFERENCE TO RELATED APPLICATION

This application claims the benefit and priority of U.S. Provisional Application No. 63/211,964, filed on Jun. 17, 2021. The entire disclosure of the above application is incorporated herein by reference.

FIELD

The present disclosure relates to the field of image analysis, and more particularly to determining a coverage of an image, such as confluence of cells in an image of a cell culture.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the field of imaging, many scenarios involve an analysis of an image to determine coverage of the image by a feature. As an example, an image of a cell culture may include a number of cells, which may be of various types, shapes, and sizes. It may be desirable for an individual, such as a researcher, to view the image of the cell culture to determine confluence—that is, coverage of the cells in the field of the image. For example, as the cell culture matures, the cells may grow and/or multiply, increasing the confluence of the image. The individual may wish to determine the confluence at a particular time point, for example, in order to determine a developmental stage of the cell culture. The individual may use such a determination to conduct research on the cell culture, for example, by treating, measuring, and/or staining the cell culture upon entering a particular developmental stage, as may be indicated by the degree of confluence.

However, some features of such estimation techniques may detrimentally impact or limit the determination of confluence by an individual. As a first example, reliance on coverage determinations (such as confluence estimation and/or cell counting) by individuals may be time-consuming, for example, if the volume of images to be evaluated is large and/or the cells are numerous. As a result, determinations of coverage may be inefficient, which may limit the number of images that may be timely evaluated for a cell culture population and/or may delay the presentation of coverage determinations, such that the cells in a cell culture have matured to an advanced developmental stage by the time an image of an earlier developmental stage is evaluated.

As a second example, reliance on coverage determinations by individuals may be imprecise, for example, if coverage estimates or confluence estimates are measured qualitatively as "dense," "medium," or "sparse," where different individuals may have different thresholds between such categories, and/or an individual's thresholds may change over time. As a third example, reliance on coverage determinations by individuals may be difficult, for example, due to the presence of other visible material in the image, such as debris such as non-cell tissue pieces, contaminants such as dust, and/or artifacts of the image, imaging process, or display. In such cases, it may be difficult for the individual to distinguish between cells and non-cell features of the image, which may lead to overestimation or underestimation of coverage of the image.

In some cases, it may be possible to assist an individual in the evaluation of coverage of an image by using an automated image analysis technique. However, many such techniques may perform relatively poorly on images with higher degrees of coverage, for example, high-confluence slides where cells are densely arranged. In such cases, many image analysis techniques may fail to recognize at least some of the cells, resulting in a coverage underestimation, such as a confluence underestimate of the cell culture. As a result of such confluence underestimation, further research processes that are based on the cell culture reaching a specific developmental stage, as indicated by confluence, may be delayed to a time point that is later than the actual specific developmental stage, which may produce unexpected results and/or may compromise the integrity of resulting cell cultures or data.

It may be desirable to provide image evaluation techniques that perform accurate coverage evaluation of images, which may improve the achievable rate and/or volume of image evaluation and/or other processes based thereupon. In particular, it may be desirable to provide image evaluation techniques that perform accurate coverage evaluation of higher-coverage images, such as higher-confluence confluence images of cell cultures.

SUMMARY

In some example embodiments, an apparatus includes processing circuitry configured to generate a first segmentation mask by segmenting an image, generate a modified mask by applying a morphological operation to the first segmentation mask, generate a modified masked input based on the image and an inversion of the modified mask, generate a second segmentation mask by segmenting the modified masked input, and determine a coverage of the image based on the first segmentation mask and the second segmentation mask.

In some example embodiments, a system includes an image evaluator configured to generate a first segmentation mask by segmenting an image, generate a modified mask by applying a morphological operation to the first segmentation mask, generate a modified masked input based on the image and an inversion of the modified mask, generate a second segmentation mask by segmenting the modified masked input, and determine a coverage of the image based on the first segmentation mask and the second segmentation mask.

In some example embodiments, a non-transitory computer-readable storage medium storing instructions that, when executed by processing circuitry, cause an apparatus to generate a first segmentation mask by segmenting an image, generate a modified mask by applying a morphological operation to the first segmentation mask, generate a modified masked input based on the image and an inversion of the modified mask, generate a second segmentation mask by segmenting the modified masked input, and determine a coverage of the image based on the first segmentation mask and the second segmentation mask.

In some example embodiments, a method of operating an apparatus include executing, by processing circuitry, instructions that cause an apparatus to generate a first segmentation mask by segmenting an image, generate a modified mask by applying a morphological operation to the first segmentation mask, generate a modified masked input based on the image and an inversion of the modified mask, generate a second segmentation mask by segmenting the modified masked input, and determine a coverage of the image based on the first segmentation mask and the second segmentation mask.

Some example embodiments include adjusting a feature of the image to generate an adjusted image, and generating the first segmentation mask includes segmenting the adjusted image. In some example embodiments, adjusting the feature of the image includes normalizing an illumination level of the image. In some example embodiments, normalizing the image illumination level of the image includes applying a Gaussian blur. For example, a Gaussian blur may be applied to a copy of the image and the blurred copy is then subtracted from the image.

In some example embodiments, adjusting the feature of the image includes increasing a local contrast level of the image. In some example embodiments, increasing the local contrast level of the image includes applying a contrast-limited adaptive histogram equalization to the image.

In some example embodiments, generating the first segmentation mask includes segmenting the image based on an edge filter. In some example embodiments, generating the first segmentation mask includes applying a Gaussian blur to the image. In some example embodiments, generating the first segmentation mask includes increasing a contrast level of the image.

In some example embodiments, the morphological operation includes one or more of, an open morphological operation, a close morphological operation, a dilation morphological operation, or an erosion morphological operation.

In some example embodiments, segmenting the modified masked input includes segmenting the modified masked input based on an edge filter. In some example embodiments, segmenting the modified masked input includes applying a Gaussian blur to the modified masked input. In some example embodiments, segmenting the modified masked input includes increasing a contrast level of the modified masked input.

Some example embodiments may include combine the first segmentation mask and the second segmentation mask to generate a composite mask. In some example embodiments, generating the composite mask includes applying a non-cell filter to the composite mask to exclude non-cell areas of the composite mask. In some example embodiments, excluding the non-cell areas of the composite mask is based on one or more of, a morphology of the non-cell areas, or a size of the non-cell areas.

In some example embodiments, determining the coverage of the image includes presenting the masked input image as an illustration of the coverage of the image. In some example embodiments, determining the coverage includes estimating a coverage of the composite mask.

BRIEF DESCRIPTION OF THE DRAWINGS

The present disclosure will become more fully understood from the detailed description and the accompanying drawings. In the drawings, reference numbers may be reused to identify similar and/or identical elements.

DETAILED DESCRIPTION

A. Introduction

The following introduction is intended to provide an overview of some image analysis features, including machine learning techniques, that relate to some example embodiments.

Figure 1:
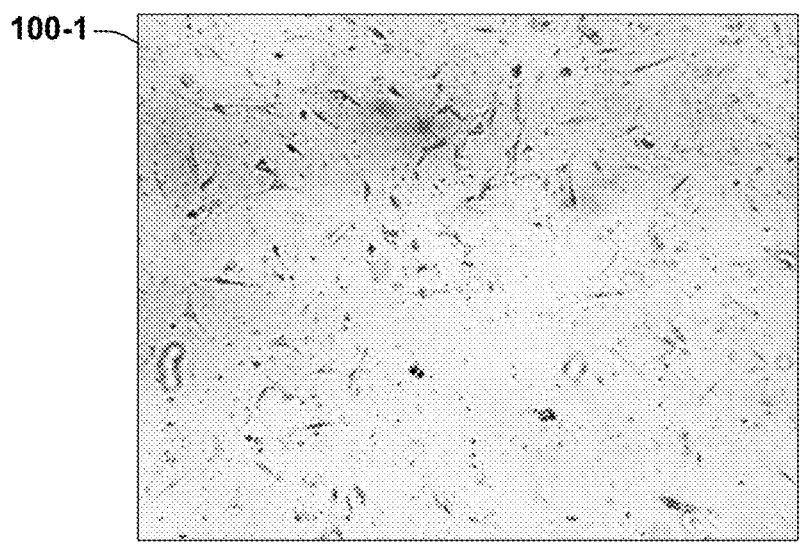
FIG. 1 is an illustration of example cell culture images of varying confluence.
Figure 1:
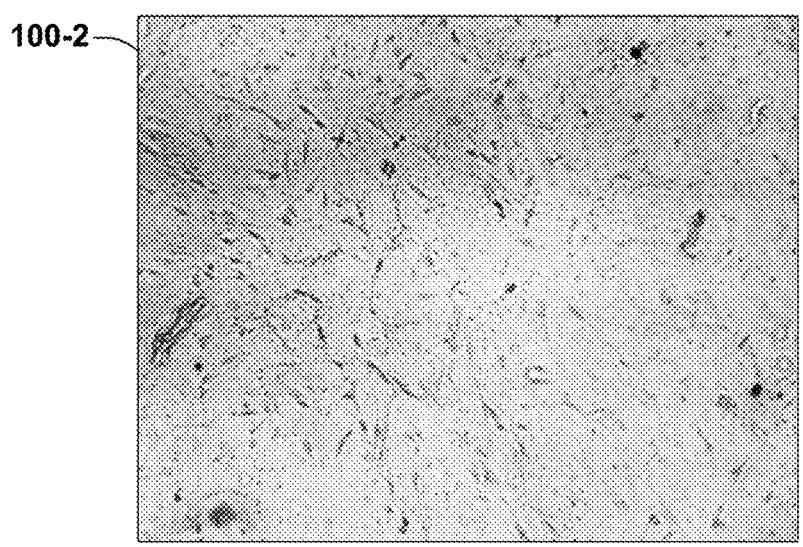
Figure 1:
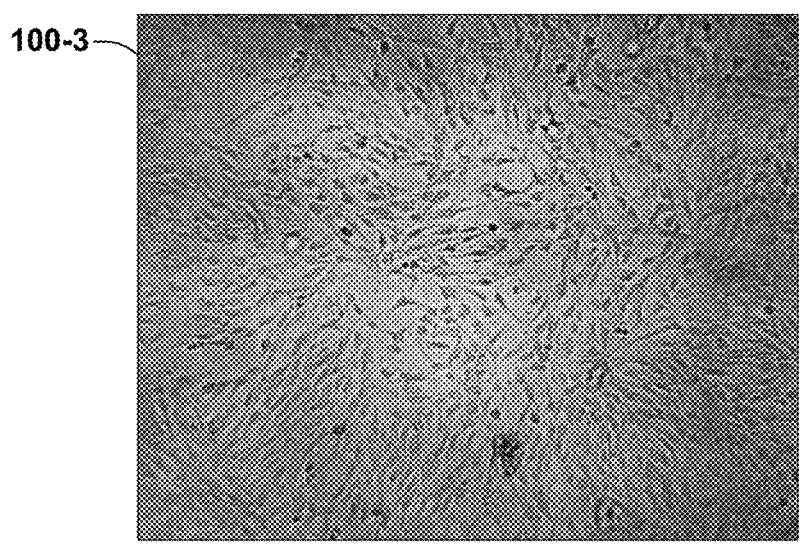

FIG. 1 is an illustration of example cell culture images of varying confluence, which are presented as examples of images with varying coverage. In FIG. 1, a first cell culture image 100-1 shows a low confluence—that is, a low coverage of a field of the first cell culture image 100-1 by cells. A second cell culture image 100-2 shows a medium confluence—that is, a medium coverage of a field of the second cell culture image 100-2 by cells. A third cell culture image 100-3 shows a high confluence—that is, a high coverage of a field of the third cell culture image 100-3 by cells. In various implementations, confluence may be quantitatively defined as a percent of a culture dish covered by adherent cells. When referring to a specific image, confluence may be quantitatively defined as a percent of the culture dish shown in the image that is covered by adherent cells.

As may be appreciated by comparing the cell culture images 100-1, 100-2, 100-3 of FIG. 1, an estimation of the coverage of each cell culture image by an individual may yield variable degrees of accuracy. As a first such example, in the first cell culture image 100-1, the cells are readily apparent and may be counted or estimated easily due to wide spacing between the cells; while in the third cell culture image 100-3, the cells may be more difficult to distinguish from one another due to the density of the coverage. Also note the difference in background intensity, which can confuse implementations of cell counting algorithms.

As a second such example, in the first cell culture image 100-1, the cells are spaced apart and may be easily identified as cells with a distinctive shape, rather than debris or other matter in the first cell culture image 100-1; while in the third cell culture image 100-3, the density of the cells may make it difficult to distinguish cells from debris or other matter in the first cell culture image 100-3. As a result of such difficulties, the accuracy of estimates of the coverage of the cell culture images 100-1, 100-2, 100-3 may vary, and in particular may be less accurate as the confluence of the cell cultures increases.

Developing an automated process for evaluating image confluence removes human error and makes evaluations of confluence more reproducible. For example, different human experts may provide different estimations for the same image; even a single expert may provide different estimations for the same image at different points in time.

Figure 2:
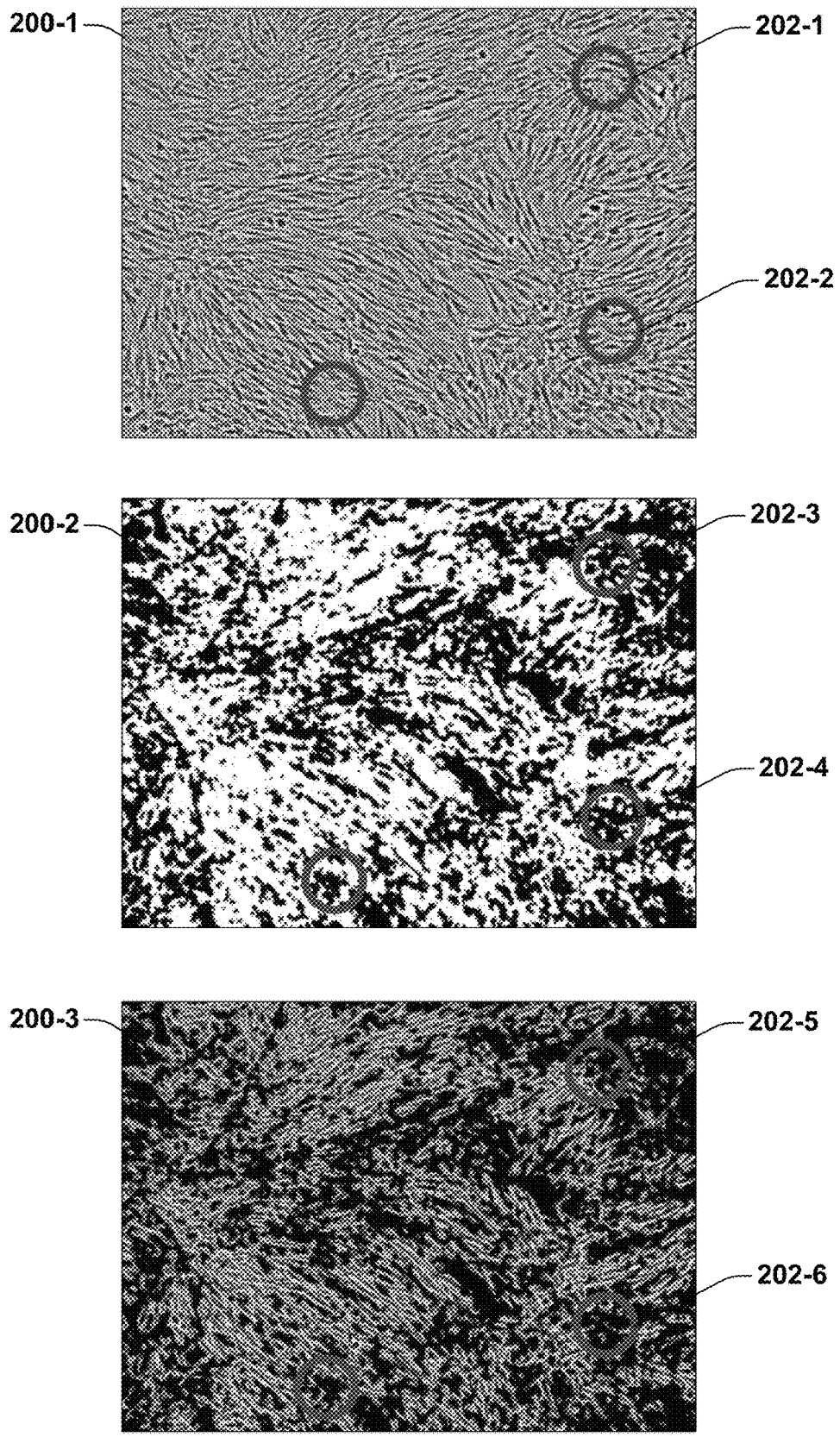
FIG. 2 is an illustration of an example evaluation of a high-confluence cell culture image that underestimates confluence in some areas of the cell culture image according to some image evaluation processes.

FIG. 2 is an illustration of an example evaluation of a high-confluence cell culture image that underestimates confluence in some areas of a cell culture image according to some image evaluation processes. In an original cell culture image 200-1, some areas 202-1, 202-2 of the cell culture may include cells in areas of high visual density, such that it may be difficult to distinguish the individual cells from one another, and/or to distinguish cells from non-cell matter. In a high-contrast or binarized (that is, mapping pixels to one of two binary values, black or white) version of the cell culture image 200-2, the corresponding areas 202-3, 202-4 may be still more difficult to characterize as cells, non-cell matter, empty space due to a loss of detail in these dense areas, and may incorrectly be characterized as non-cells.

In an evaluated version of the cell culture image 200-3, the areas 202-5, 202-6 that appeared as cells are now characterized as empty space. As a result of this loss of detail and mischaracterization in the high-density areas of the high-confluence cell culture, a confluence of the cell culture image 200-1 may be underestimated. As a result of such confluence underestimation, further research processes that are performed in response to the cell culture corresponding to cell culture image 200-1 reaching a specific developmental stage, as indicated by confluence, may be delayed to a time point that is later than the specific developmental stage. This may produce unexpected results and/or may compromise the integrity of resulting cell cultures or data.

B. Presented Techniques

Figure 3:
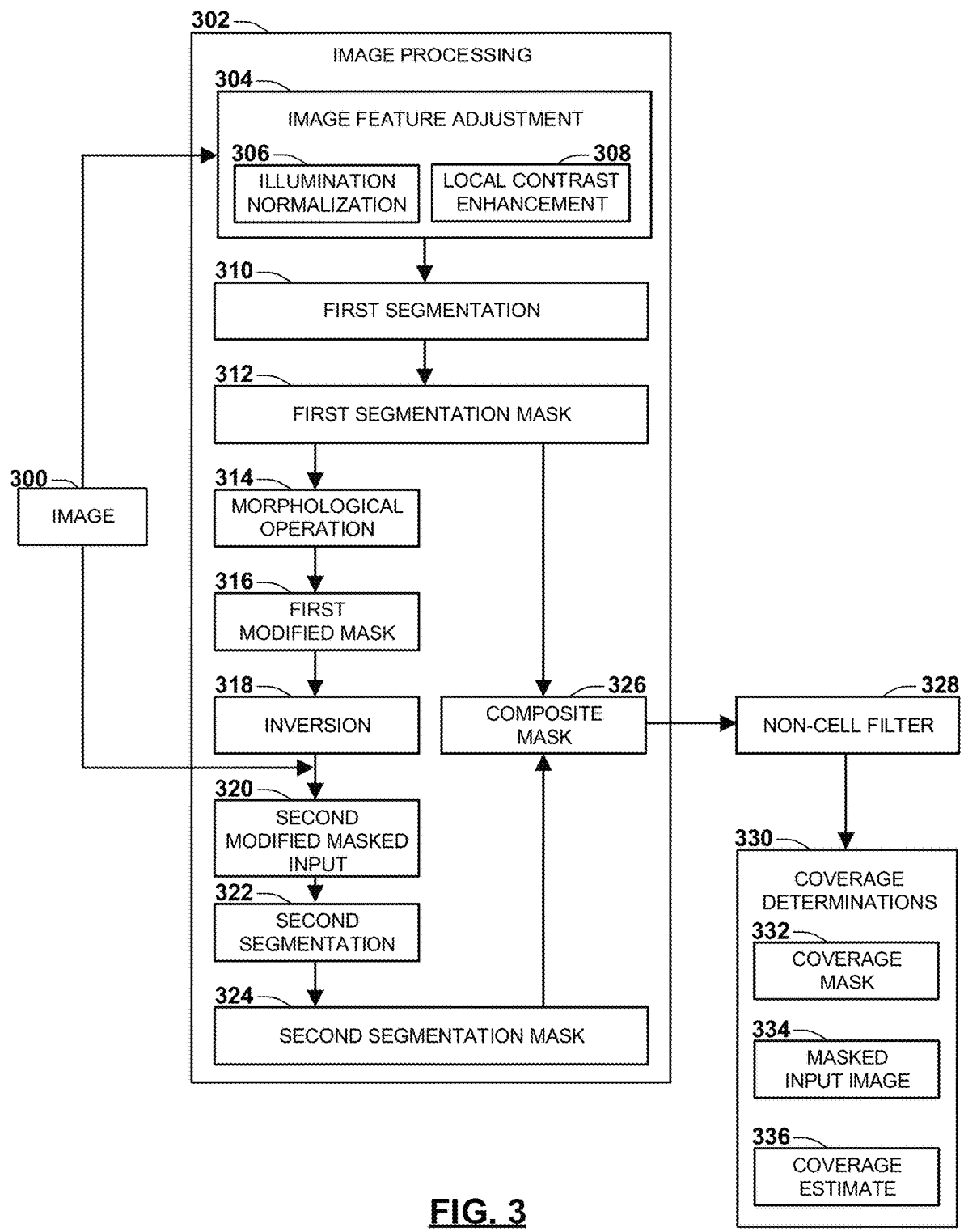
FIG. 3 is an example of an image technique for determining a coverage of the image in accordance with some example embodiments.

FIG. 3 is an example of an image processing technique for determining a coverage of the image in accordance with some example embodiments. Select portions of FIG. 3 are further illustrated in FIGS. 4-12.

In the example image processing technique 302 of FIG. 3, an image 300 is provided for which a coverage determination is desired. As an example, the image 300 may be an image of a cell culture, such as a group of cells taken from a tissue sample of an individual. For example, the cell culture may represent immune cells, NK-92 cells, T-cells, immune competent cells, CHO cells, HEK cells, HeLa cells, healthy tissue, unhealthy tissue such as a tumor, and/or tissue of unknown composition, such as an indeterminate tissue that may or may not include cancerous cells. Other such images 300 may include other organic features, such as microorganisms, and/or inorganic features, such as a crystalline structure. The features of the images may be macroscopic, such as visible to the eye of an individual without assistance, or microscopic, such as small features that are visible under optical and/or digital magnification of the image.

In the example image processing technique 302 of FIG. 3, a coverage determination 330 of a coverage of the image 300 is desired. The coverage to be determined may include, for example, a coverage mask 332, such as a bitmap that indicates which areas of the image 300 are covered by cells (e.g., represented by white pixels) and which areas of the image 300 are not covered by cells (e.g., represented by black pixels) or vice versa; a masked input image 334, such as an outlining of areas of the image 300 that are covered, which may be further evaluated and/or presented to an individual; and/or a coverage estimate, such as a confluence or coverage estimate 336 based on a measurement of an area of the image 300 that depicts cells within a total area of the image 300, which may be reported to an individual as a density (e.g., cells/mm$^2$), a count (e.g., 250 cells apparent in the area of the image); and/or a confluence ratio of the covered area of the image 300 to a total area of the image 300 (e.g., 60% confluence).

The example image processing technique 302 of FIG. 3 begins with one or more image feature adjustments 304. As a first example, an illumination normalization 306 may be applied to the image 300 to normalize an illumination level of the image 300. For example, a lightness, brightness, and/or contrast level of the image 300 may be adjusted to raise and/or lower an average illumination of the image 300 toward a target average illumination for which the remaining image processing features are well-suited. One such form of illumination normalization 306 may include applying a Gaussian blur to a copy of the image 300 and then subtracting the blurred copy from the image 300.

In various implementations, a local contrast enhancement 308 may be applied to the image 300 to promote a target contrast level of each localized area of the image 300 to reduce high-contrast shifts that may be due to visual artifacts such as inconsistent lighting or shadowing. One such form of local contrast enhancement 308 may include applying a contrast-limited adaptive histogram equalization ("CLAHE") process to the image 300. One or more such image feature adjustments 304 may be applied to the image 300 to produce an adjusted image for additional processing by the image processing technique 302.

Figure 4:
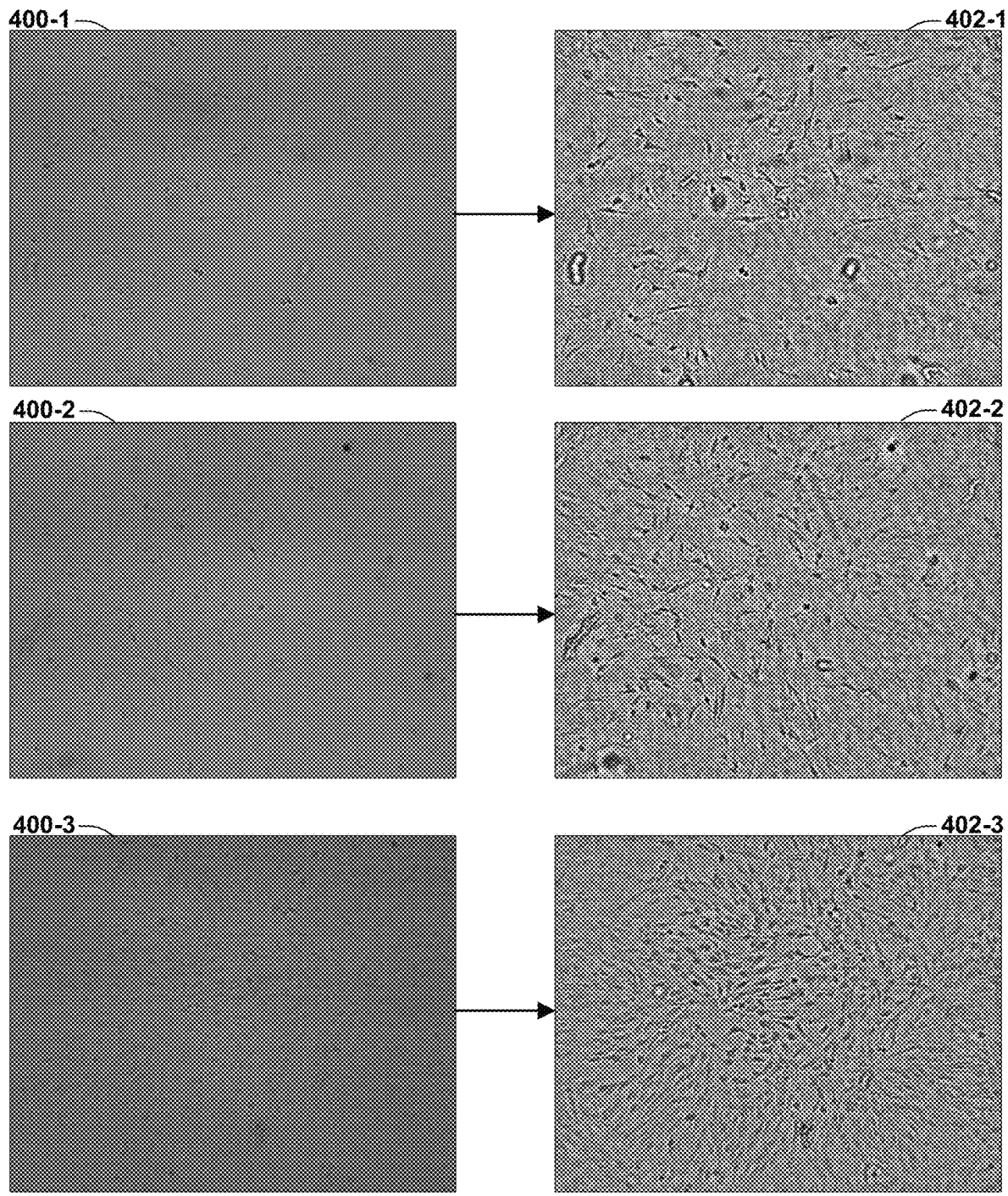
FIG. 4 is an illustration of a first example of image feature adjustments in accordance with some example embodiments.

FIG. 4 is an illustration of a first example of image feature adjustments in accordance with some example embodiments. Images 400-1, 400-2, 400-3 of varying confluence are processed by an illumination normalization process and contrast enhancement (such as CLAHE). The corresponding adjusted images 402-1, 402-2, 402-3 present higher-contrast images with sharper boundaries that may be more accurately evaluated for segmentation.

Figure 5:
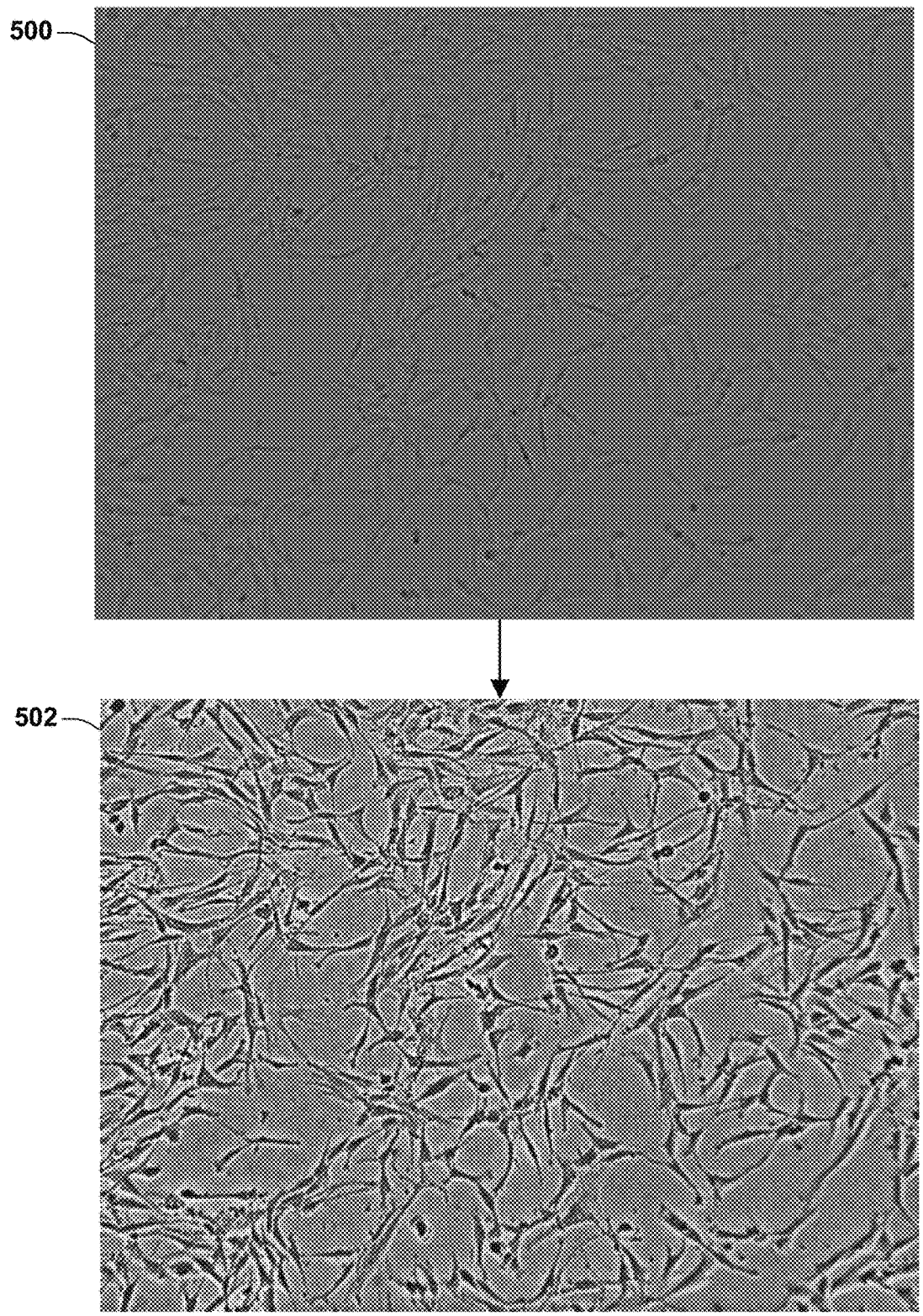
FIG. 5 is an illustration of a second example of image feature adjustments in accordance with some example embodiments.

FIG. 5 is an illustration of a contrast adjustment process in accordance with some example embodiments. In FIG. 5, a local contrast adjustment process, such as CLAHE, is applied to an image 500 to produce an adjusted image 502 with sharper boundaries that may be more accurately evaluated for segmentation. In various implementations, the CLAHE may be regulated by a "clipLimit" parameter, which is automatically determined based on the average contrast of the image 500.

The local contrast adjustment shown in FIG. 5 may be applied alternatively or together with the illumination normalization and/or Gaussian blur. In various implementations, the local contrast adjustment shown in FIG. 5 may be applied before, concurrently with, and/or after illumination normalization and/or Gaussian blur.

Returning to FIG. 3, the example image processing technique 302 of FIG. 3 may include a first segmentation 310, wherein the image 300 (or, in some example embodiments, an adjusted image provided generated by the image feature adjustment 304) is evaluated to determine edges or boundaries to produce a first segmentation mask 312. The first segmentation 310 may produce, for example, a set of descriptors of edges or boundaries of the image 300 or an adjusted image, such as the locations, dimensions, and/or shapes of high-contrast boundaries that may represent visual features such as cells.

In some example embodiments, the first segmentation 310 may include applying one or more edge detection filters to the image 300. As a first such example, a Sobel X-axis filter may be applied to the image 300 or an adjusted image. The Sobel X-axis filter is configured to detect high-contrast differences between horizontally adjacent pixels, which may indicate vertical edges. An example 3×3 Sobel X-axis filter is represented by the following filter matrix:

$$\begin{bmatrix} -1 & 0 & 1 \\ -2 & 0 & 2 \\ -1 & 0 & 1 \end{bmatrix}$$

As a second such example, a Sobel Y-axis filter may be applied to the image 300 or an adjusted image. The Sobel Y-axis filter is configured to detect high-contrast differences between vertically adjacent pixels, which may indicate horizontal edges. An example 3×3 Sobel Y-axis filter is represented by the following filter matrix:

$$\begin{bmatrix} -1 & -2 & -1 \\ 0 & 0 & 0 \\ 1 & 2 & 1 \end{bmatrix}$$

In various implementations, Sobel X-axis and Y-axis filters may be applied separately to an image and then the resulting filtered images combined to create a combined Sobel-XY filter. In various implementations, other edge detection mechanisms may be used, such as Canny edge detectors. See, for example, U.S. Pat. No. 10,229,342 to Song et al., issued Mar. 12, 2019, the entire disclosure of which is incorporated here by reference. Once edges (ideally, of one or more cells) are identified, the edges can be used to determine geometric properties of the apparent cells, such as like major axis, minor axis, size, vertices, etc.

Many such segmentation image processing techniques may be applied to segment the image 300, or an adjusted image based on the image feature adjustments 304, to produce the first segmentation mask 312. Further, in some example embodiments, additional image processing may be applied to the image 300 (including an adjusted image) before, during, and/or after the first segmentation 310. As a first such example, generating the first segmentation mask 312 may include applying a Gaussian blur to the segmented image 300, for example, to increase a smoothness and/or decrease a roughness or unevenness in the identified edges or boundaries.

As a second such example, generating the first segmentation mask 312 may include increasing a contrast level of the segmented image 300, such as by applying an intensity threshold to convert a grayscale segmented image into a binarized, one-bit bitmap that indicates which areas of the segmented image 300 are within a segmented area (e.g., a cell demarcated by a cell boundary) and which areas of the image 300 are not covered by cells (e.g., empty space or non-cell matter) or vice versa. The first segmentation 310 may output a first segmentation mask 312 for further processing.

Figure 6:
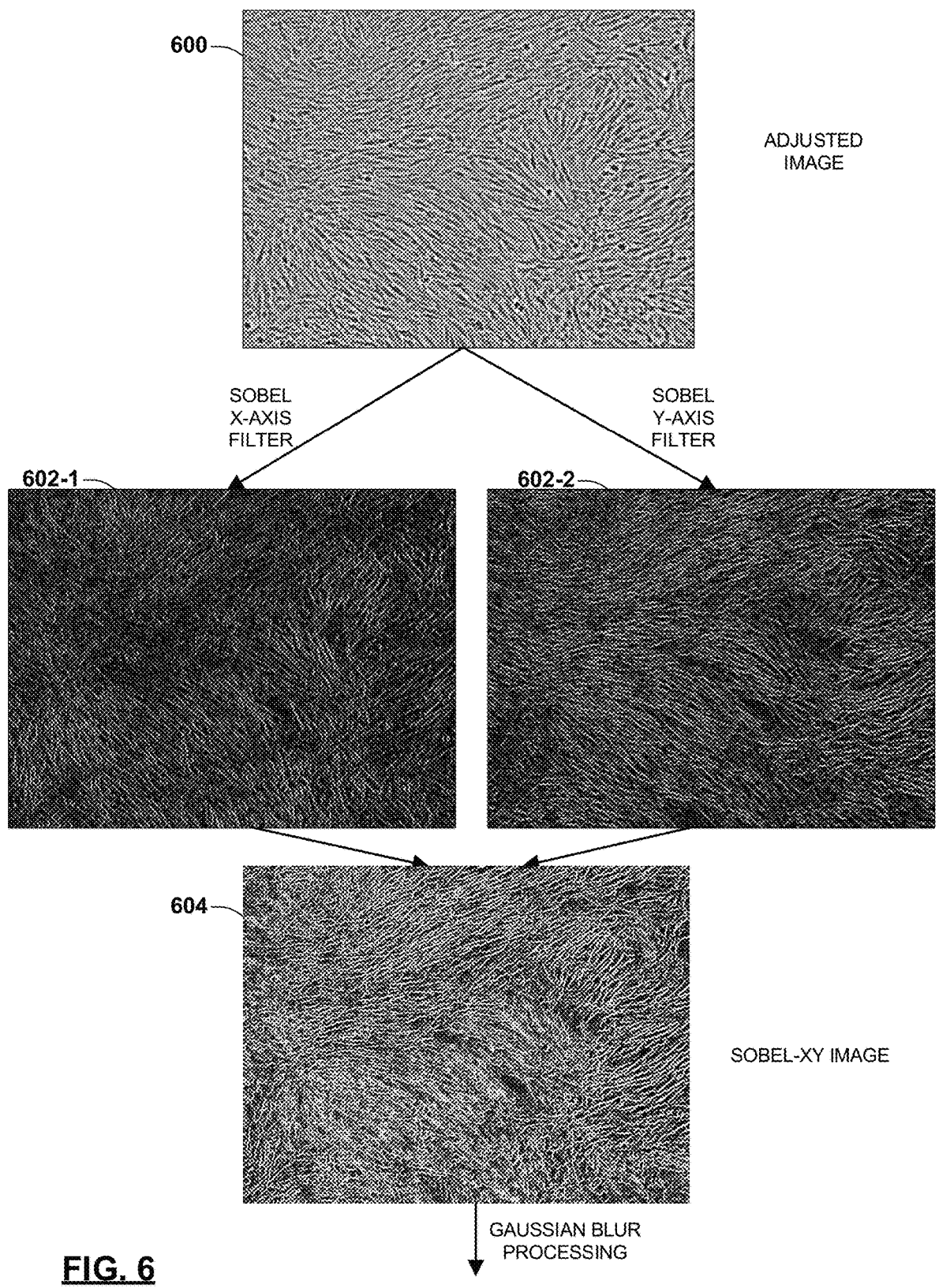
FIG. 6 is an illustration of a first part of an example first segmentation of an adjusted image in accordance with some example embodiments.

FIG. 6 is an illustration of a first part of an example first segmentation of an adjusted image in accordance with some example embodiments.

In the illustration of FIG. 6, an adjusted image 600 is received (e.g., after applying image feature adjustments 304 such as shown in FIGS. 4 and 5) and is subjected to a Sobel X-axis filter, producing a first segmented image 602-1 in which vertical edges or boundaries are accentuated. Alternatively or additionally, the adjusted image 600 is subjected to a Sobel Y-axis filter, producing a second segmented image 602-2 in which horizontal edges or boundaries are accentuated.

The first and second segmented images 602-1 and 602-2 may be combined to create an image 604 that effectively has a combined Sobel XY filter. The image 604 may then be subjected to a Gaussian blur, as described with respect to FIG. 7.

Figure 7:
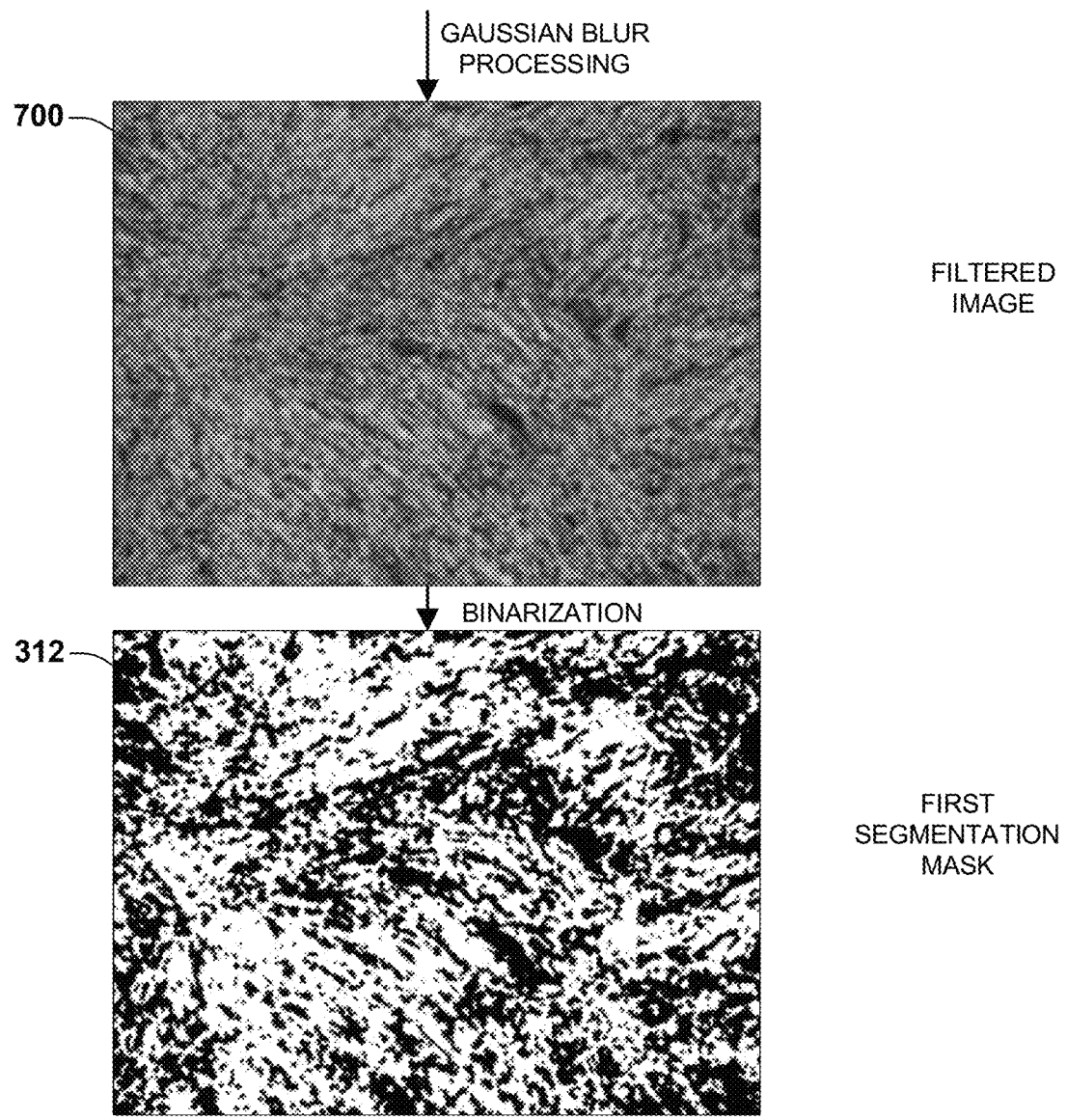
FIG. 7 is an illustration of a second part of an example first segmentation of an adjusted image in accordance with some example embodiments.

FIG. 7 is an illustration of a second part of an example first segmentation of an adjusted image in accordance with some example embodiments. A Gaussian blur is applied to an image, such as the image 604 of FIG. 6, to produce a third filtered image 700, featuring smoother edges or boundaries.

A binarization may then be applied (that is, converting the grayscale third filtered image 700 to a one-bit bitmap) to produce the first segmentation mask 312, which is a high-contrast segmented image. In this disclosure, binarization may be performed using an adaptive threshold that is dependent on the data of the image. For example, the adaptive threshold may be determined using Otsu's method. Otsu's method may be initiated with a threshold value of 0 to minimize information loss within the binarization phase. For example only, an OpenCV implementation of Otsu's method may be used.

Returning to FIG. 3, the example image processing technique 302 of FIG. 3 may include applying one or more morphological operations 314 to the first segmentation mask 312 to generate a first modified mask 316, wherein each of the one or more morphological operations 314 may change a shape of one or more visual features of the first segmentation mask 312. In various embodiments, the one or more morphological operations 314 may be applied in series in a predefined order. The idea behind morphological operators is to "clean" the estimated binary mask from small "white noise" (that is, pixels wrongly classified as cells) and "black noise" (that is, pixels wrongly classified as background).

The one or more morphological operations 314 may include a dilate (or dilation) operation, an erode (or erosion) operation, an open operation, and a close operation. Further descriptions of morphological operations can be found in Mathematical Morphology, Wikipedia, available at en.wikipedia.org/wiki/Mathematical_morphology, the entire contents of which (as of Jun. 16, 2021) are incorporated by reference.

In various embodiments, the dilate operation adds one or more white pixels to the edges or boundaries of an object. In various embodiments, the erode operation subtracts one or more white pixels from boundaries of an object. In various embodiments, the open operator is a composite operator that includes performing an erode operation followed by a dilate operation, with the effect of erasing a small area of white pixels surrounded by black pixels. In various embodiments, the close operator is a composite operator that includes performing a dilate operation followed by an erode operation, with the effect of erasing a small area of black pixels surrounded by white pixels.

In various implementations, morphological operations are generally used to "prepare" an image for the second segmentation phase. For example, the morphological operations are selected to "clean" the first segmented image, such as by using morphological OPEN and CLOSE operations to erase white and black noise, respectively. After such operations, two morphological EROSION operations are applied to the resulting image, with the effect to erase some pixels (in this case one per operation) from the edges of cells. The result is a modified first segmentation mask with a significant erosion of cell's edges. The modified mask is then negated and applied to the input image (which may have been first processed with illumination correction and contrast enhancement).

Figure 9:
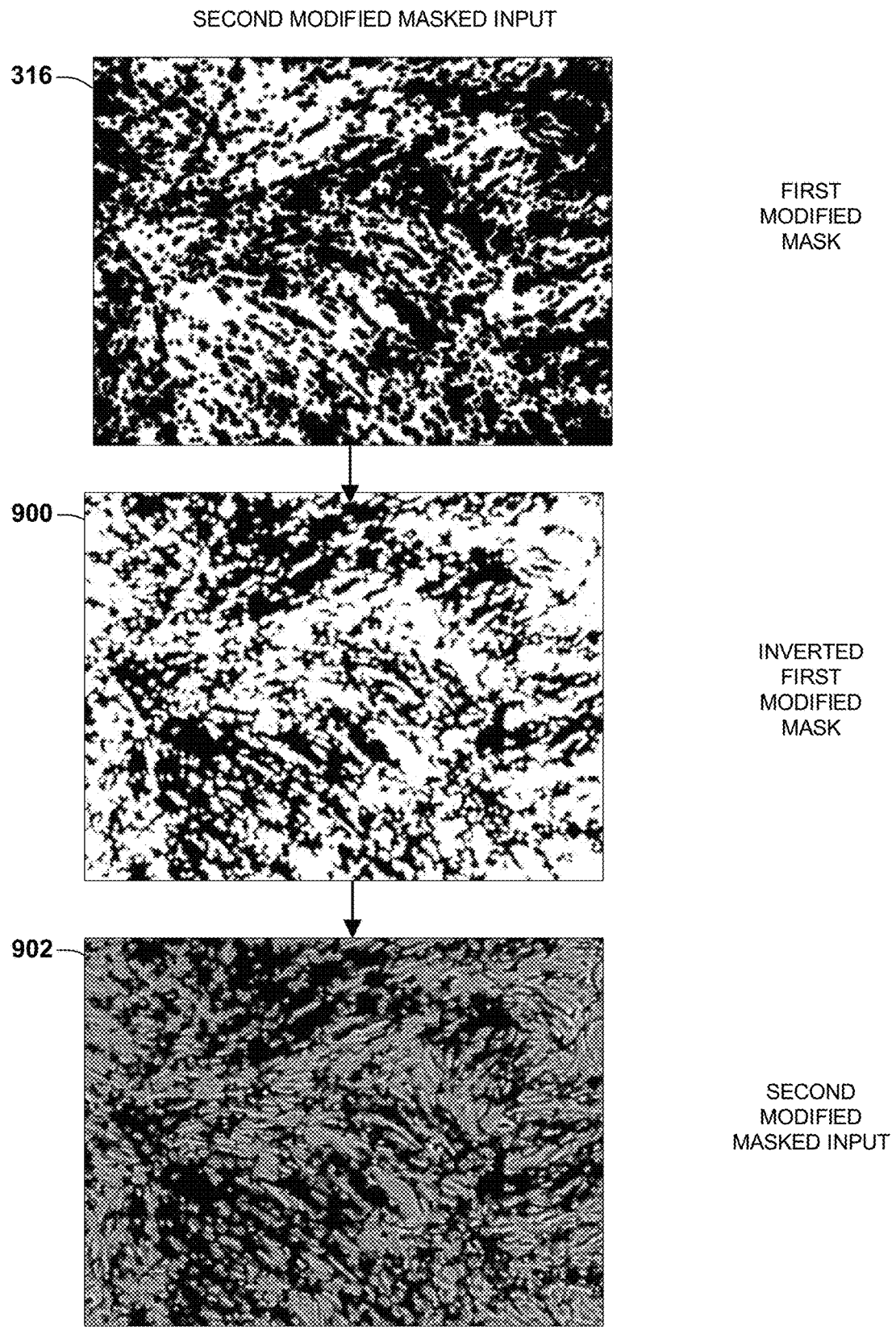
FIG. 9 is an illustration of a second modified masked input generated in accordance with some example embodiments.

The effect of modifying and then negating the first segmentation mask to create a new mask for the second segmentation phase is to provide a mask that is more likely to include cells edges in areas that have not been segmented before, providing to the edge detection (such as Sobel or Canny) the real edges of cells instead of artificial edges given from the application of a mask (for example, black areas as shown in 902 of FIG. 9). In various implementations, after morphological OPEN and CLOSE operations, the first segmentation mask is modified with two morphological EROSION operations. Since this modified mask is negated, the effect of such erosions is to artificially grow the "cells area" in order to include the real edge of a cell to perform a second segmentation in a more fair context (with less "artificial edges").

In various implementations, a set of morphological operations may be integrated into an imaging process method as follows:
0) obtain input image (with illumination normalization and local contrast enhancement)
1) generate a first segmentation mask
2) perform morphological "OPEN" over 1, which in various implementations cleans small white noise
3) perform morphological "CLOSE" over 2, which in various implementations cleans small black noise ("fills" small black "holes" surrounded by white pixels)
4) perform morphological "EROSION" over 3, which in various implementations erodes one (white) pixel from objects in 3
5) perform morphological "EROSION" over 4, which in various implementations erodes one (white) pixel from objects in 4
6) perform pixelwise NOT (negation) of 5
7) perform pixel-wise multiplication of 0 and 6 to filter the processed input image 0 with mask 6. The effect may be to obtain a masked input image in which the real edges of cells (which have not been segmented in the first segmentation phase) are present.

8) process 7 to obtain a second segmentation mask

Selection of morphological operations may be independent of image resolution, image size, as well as cell type. Kernel size could be context-dependent, but in various implementations the smallest size possible is used in order to clean the image from "single pixel noise" while minimizing the introduction of artificial information.

Some a priori knowledge may be used. For example, in various implementations a circularity filter filters out small, circular objects, which are assumed to not be cells, from the final segmentation. This a priori knowledge may be based on the cells to be studied. For example, mesenchymal stem cells have an elongated form, and should therefore not show up as small circles. Using this a priori knowledge, objects that do not correspond to the average size and elongated shape of expected cells may be filtered out by the area and circularity filter (see FIG. 13), which recognizes small and almost round objects and filters them out from the final binary mask. The size and roundness parameters may be determined experimentally for a given type of cell. Further examples of cell types are human muscle fiber and human fibroblasts, which both have an elongated form. A visual inspection of the automated results confirm that the method described in this application works as expected on different cell types, including those characterized by an elongated shape.

Figure 8:
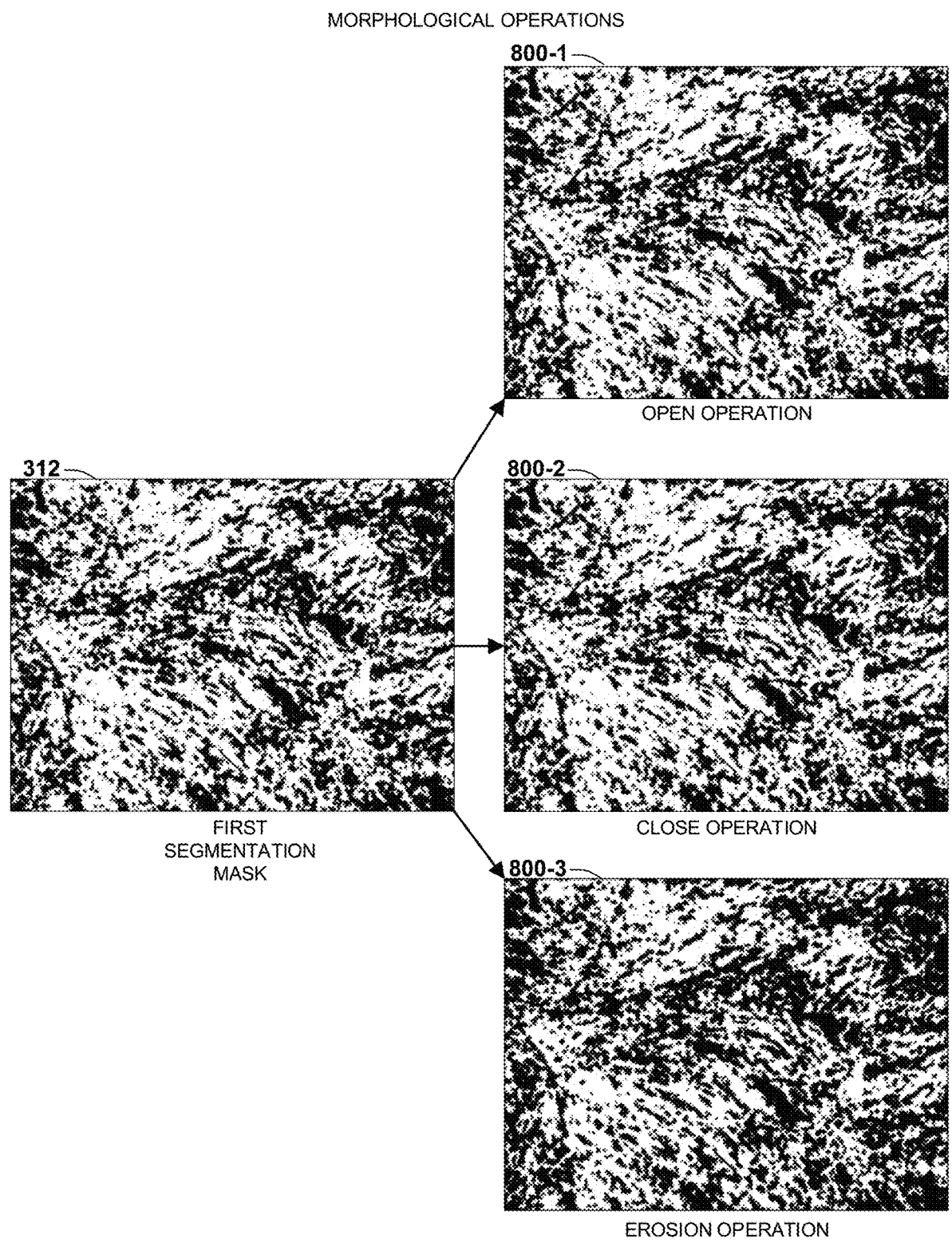
FIG. 8 is an illustration of an example set of morphological operations that may be applied to a first segmentation mask in accordance with some example embodiments.

FIG. 8 is an illustration of an example set of morphological operations that may be applied to a first segmentation mask in accordance with some example embodiments. In the illustration of FIG. 8, the first segmentation mask 312 of FIG. 7 may be subjected to one or more of several morphological operations. As a first such example, an open morphological operation 800-1 may be applied to the first segmentation mask 312, in which edges or boundaries of the first segmentation mask 312 are expanded and then reduced by one or more pixels. As a second such example, a close morphological operation 800-2 may be applied to the first segmentation mask 312, in which edges or boundaries of the first segmentation mask 312 are reduced and then expanded by one or more pixels. As a third such example, an erosion morphological operation 800-3 may be applied to the first segmentation mask 312, in which concave and/or convex irregularities in edges or boundaries of the first segmentation mask 312 are reduced by one or more pixels.

In some example embodiments, one or more of the morphological operations 800-1, 800-2, 800-3 may be applied before, concurrently with, and/or after another one or more of the morphological operations 800-1, 800-2, 800-3 to produce a first modified mask 316 in accordance with some example embodiments. For example, the morphological operations may be applied serially in a cascade to the first segmentation mask 312.

Returning to FIG. 3, the example image processing technique 302 of FIG. 3 may include generating a second modified masked input 320 based on the image 300 (or, optionally, an adjusted image generated by image feature adjustment 304) and an inversion 318 of the first modified mask 316. For example, if the first modified mask 316 is a one-bit bitmap in which white pixels represent covered areas and black pixels represent uncovered areas, an inversion 318 of the first modified mask 316 may include a one-bit bitmap in which black pixels represent covered areas and white pixels represent uncovered areas, or vice versa.

Further, in some example embodiments, the second modified masked input 320 may be generated by combining the image 300 (or, optionally, an adjusted image generated by image feature adjustment 304) and the inversion 318 of the first modified mask 316. In some example embodiments, the second modified masked input 320 may be generated by performing a pixelwise multiplication (e.g., a pixelwise AND) of an adjusted image generated by the image feature adjustment 304 and the inversion 318 of the first modified mask 316. In some example embodiments, the second modified masked input 320 may be generated by otherwise combining the image 300 (or, optionally, an adjusted image generated by image feature adjustment 304) and the inversion 318 of the first modified mask 316, such as by addition or averaging.

FIG. 9 is an illustration of a second modified masked input generated in accordance with some example embodiments.

In the illustration of FIG. 9, a first modified mask 316 is inverted to produce an inverted first modified mask 900, for example, by inverting the one-bit values of a one-bit bitmap of the first modified mask 316. Further, the inverted first modified mask 900 may be combined with the image 300 (or, optionally, with an adjusted image produced by the image feature adjustments 304) to produce a second modified masked input 902 in accordance with some example embodiments.

Returning to FIG. 3, the example image processing technique 302 of FIG. 3 may include a second segmentation 322 of the second modified masked input 320 to generate a second segmentation mask 324, wherein the second modified masked input 320 is evaluated to determine edges or boundaries to produce a second segmentation mask 324. The second segmentation 322 may produce, for example, a set of descriptors of edges or boundaries of the second modified masked input 320, such as the locations, dimensions, and/or shapes of high-contrast boundaries that may represent visual features such as cells.

In some example embodiments, the second segmentation 322 may include applying one or more edge detection filters to the second modified masked input 320. As a first such example, a Sobel X-axis filter may be applied to the second modified masked input 320, wherein the Sobel X-axis filter is configured to detect high-contrast differences between horizontally adjacent pixels, which may indicate vertical edges. As a second such example, a Sobel Y-axis filter may be applied to the second modified masked input 320, wherein the Sobel Y-axis filter is configured to detect high-contrast differences between vertically adjacent pixels, which may indicate horizontally edges. Many such segmentation image processing techniques may be applied to segment the second modified masked input 320 to produce the second segmentation mask 324.

Further, in some example embodiments, additional image processing may be applied to the second segmentation mask 324 before, during, and/or after the second segmentation 322. As a first such example, generating the second segmentation mask 324 may include applying a Gaussian blur to the segmented second modified masked input 320, for example, to increase a smoothness and/or decrease a roughness or unevenness in the identified edges or boundaries. As a second such example, generating the second segmentation mask 324 may include increasing a contrast level of the segmented second modified masked input 320, such as applying an intensity threshold to convert a grayscale segmented image into a binarized, one-bit bitmap that indicates which areas of the segmented second modified masked input 320 are within a segmented area (e.g., a cell demarcated by a cell boundary) and which areas of the segmented second modified masked input 320 are not covered by cells (e.g., empty space or non-cell matter) or vice versa. The second segmentation 322 may output a second segmentation mask 324 for further processing.

In some example embodiments, the first segmentation 310 and the second segmentation 322 may be identical or similar. For example, both the first segmentation 310 and the second segmentation 322 may use Sobel X-axis and/or Y-axis filters with identical or similar sizes and/or filter values, such that the segmentation of the image 300 by the first segmentation 310 to generate the first segmentation mask 312 is similar to the segmentation of the second modified masked input 320 by the second segmentation 322 to generate the second segmentation mask 324.

In some other example embodiments, the first segmentation 310 and the second segmentation 322 may be significantly different. In some example embodiments, the first segmentation 310 may be a subset of the second segmentation 322, or vice versa; for example, the first segmentation 310 may include a Gaussian blur and the second segmentation 322 may not, or vice versa. In some example embodiments, the first segmentation 310 and the second segmentation 322 may include similar operators but with different parameters, such as Sobel filters with different filter values. In some example embodiments, the operations of the first segmentation 310 and the operations of the second segmentation 322 may be wholly or substantially disjoint.

Figure 10:
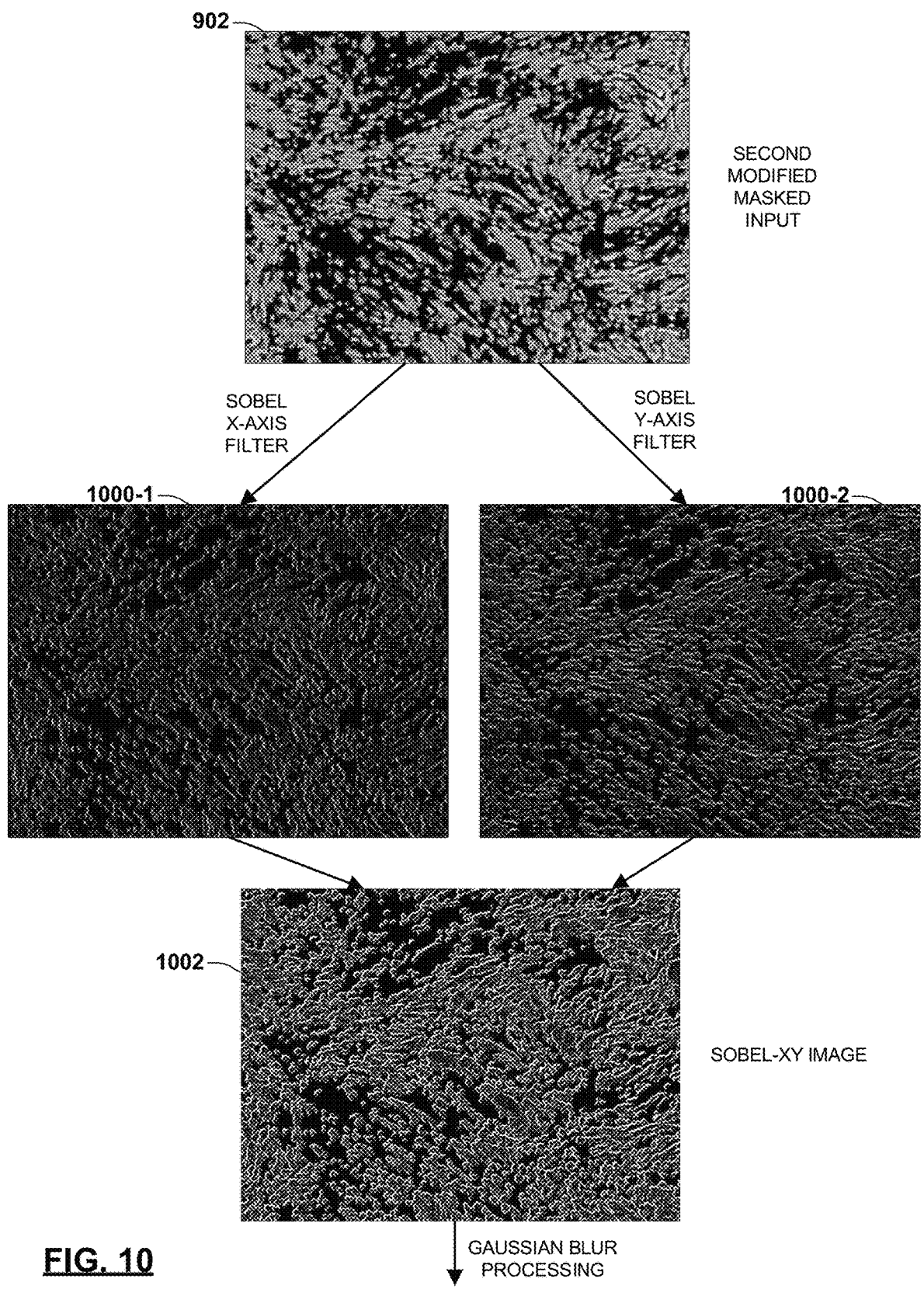
FIG. 10 is an illustration of a first part of an example second segmentation of a second modified masked input in accordance with some example embodiments.

FIG. 10 is an illustration of a first part of an example second segmentation of a second modified masked input in accordance with some example embodiments. In the illustration of FIG. 10, a second modified masked input 902 is received (e.g., based on the inverted first modified mask 316 and the image 300 or the adjusted image 600), and is subjected to a Sobel X-axis filter, producing a first segmented image 1000-1 in which vertical edges or boundaries are accentuated. Alternatively or additionally, the second modified masked input 902 is subjected to a Sobel Y-axis filter, producing a second segmented image 1000-2 in which horizontal edges or boundaries are accentuated. The images 1000-1 and 1000-2 may be combined to create a Sobel-XY image 1002. The combination may be based on a pixelwise AND, a pixelwise OR, a pixelwise XOR, or another operation that may or may not operate on a pixel-by-pixel fashion.

Figure 11:
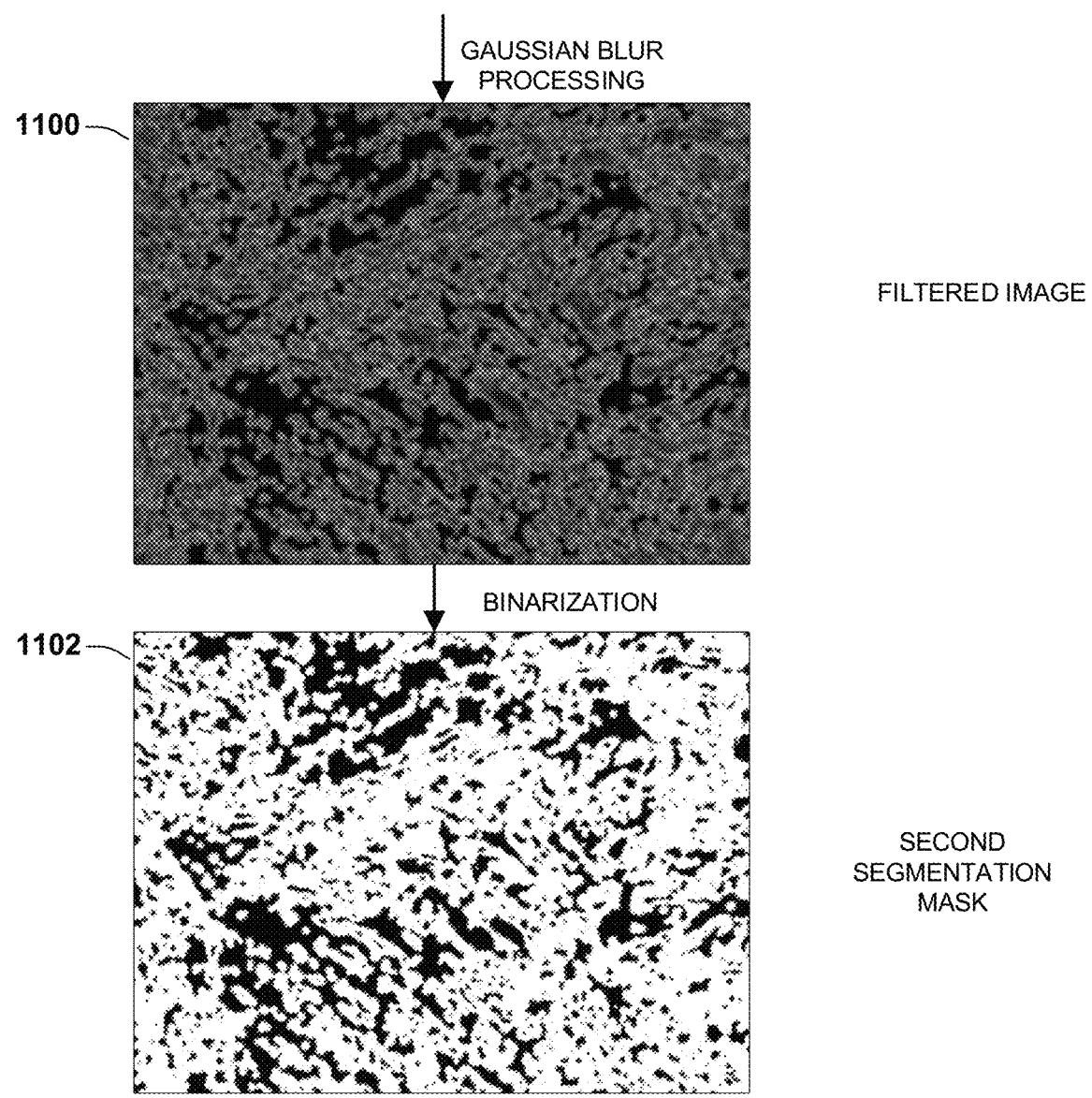
FIG. 11 is an illustration of a second part of an example second segmentation of a second modified masked input in accordance with some example embodiments.

FIG. 11 is an illustration of a second part of an example second segmentation of a second modified masked input in accordance with some example embodiments. In the illustration of FIG. 11, a Gaussian blur process is used—such as on the Sobel-XY image 1002—to produce a third filtered image 1100, featuring smoother edges or boundaries. Specifically, a Gaussian blur may be applied to a copy of the Sobel-XY image 1002 to produce the third filtered image 1100.

A binarization may then be applied (that is, converting the grayscale third filtered image 1100 to a one-bit bitmap) to produce a high-contrast segmented image 1102, which serves as the second segmentation mask 324.

Returning to FIG. 3, in some example embodiments, the first segmentation mask 312 and the second segmentation mask 324 are combined to form a composite mask 326.

Figure 12:
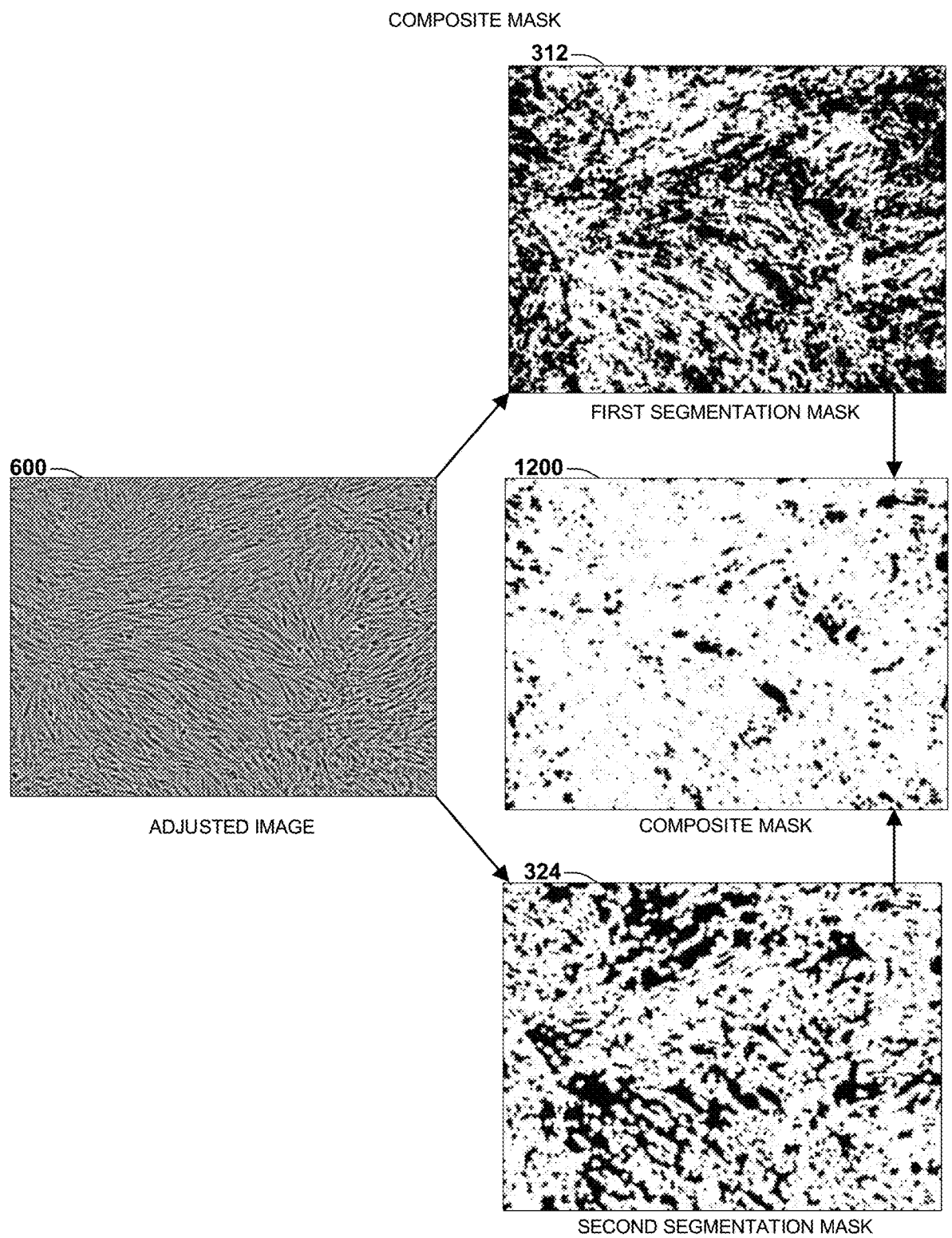
FIG. 12 is an illustration of a generation of a composite mask in accordance with some example embodiments.

FIG. 12 is an illustration of a generation of a composite mask in accordance with some example embodiments. In FIG. 12, an adjusted image 600 is processed to generate a first segmentation mask 312 (such as shown in FIG. 6) and a second segmentation mask (such as shown in FIG. 11). A composite mask 1200 may be generated based on the first segmentation mask 312 and the second segmentation mask 324—for example, by a pixelwise addition (e.g., a pixelwise OR) of the first segmentation mask 312 and the second segmentation mask 324.

Returning to FIG. 3, in some example embodiments, the example image processing technique 302 may include applying a non-cell filter 328 to the composite mask 326 to exclude non-cell areas of the composite mask 326.

Figure 13:
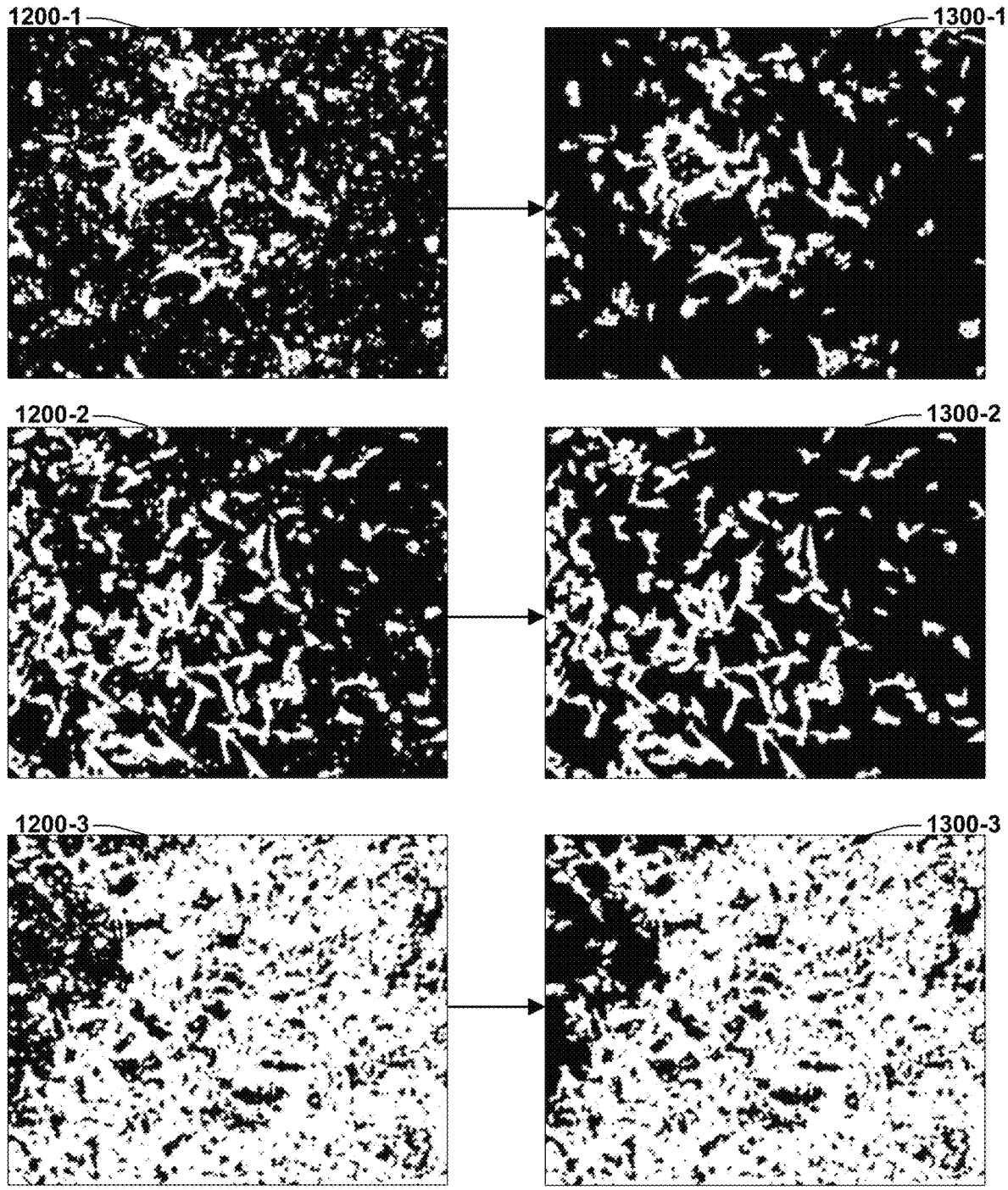
FIG. 13 is an illustration of an application of a non-cell filter to a set of composite masks in accordance with some example embodiments.

FIG. 13 is an illustration of an application of a non-cell filter to a set of composite masks in accordance with some example embodiments. In FIG. 13, a set of composite masks 1200 produced from images of varying confluence are subjected to a non-cell filter that excludes non-cell areas of the composite masks 1200. As a first such example, a first composite mask 1200-1 generated from a low-confluence image is subjected to a non-cell filter to produce a first filtered composite mask 1300-1. As a second such example, a second composite mask 1200-2 generated from a medium-confluence image is subjected to a non-cell filter to produce a second filtered composite mask 1300-2. As a third such example, a third composite mask 1200-3 generated from a high-confluence image is subjected to a non-cell filter to produce a third filtered composite mask 1300-3. As may be appreciated from inspection of the filtered composite masks, the application of the non-cell filter excludes non-cell areas of each of the composite masks 1200-1, 1200-2, 1200-3 produced from low-, mid-, and high-confluence images.

Returning to FIG. 3, in some example embodiments, the example image processing technique 302 may include a coverage determination 330 of a coverage of the image 300 based on the first segmentation mask 312 and the second segmentation mask 324.

As further shown in the example image processing technique 302 of FIG. 3, many types of coverage determinations 330 may be generated based on a composite mask 326 generated based on the first segmentation mask 312 and the second segmentation mask 324. As a first example, the coverage determination 330 may include generating a coverage mask 332, such as a one-bit bitmap that indicates areas of the image 300 that are determined to be covered. The coverage mask 332 may be presented to an individual, such as a user of the example image processing technique 302, and/or may be used in further image processing. As a second such example, the coverage determination 330 may include generating, as an output image, a masked input image 334—for example, a bitwise multiplication of the coverage mask 332 the image 300 (or, optionally, an adjusted image based on one or more image feature adjustments 304)—such that covered areas of the image 300 are shown and uncovered areas of the image 300 are not shown.

Other such masked input images 334 may be generated and presented; for example the composite mask 326 may indicate edges or boundaries between covered and uncovered areas of the image 300, and a masked input image 334 may be generated in which the edges or boundaries are drawn, highlighted, colored, etc., to demarcate the covered and uncovered areas of the image 300. As a third such example, the coverage determination 330 may include generating a coverage estimate 336, for example, a calculation of the confluence of cells in an image 300 of a tissue sample. The coverage estimate 336 may include, for example, one or more of a measurement of an area of the image 300 that depicts cells within a total area of the image 300, which may be reported to an individual as a density (e.g., cells/mm$^2$), a count (e.g., 250 cells apparent in the area of the image); and/or a confluence ratio of the covered area of the image 300 to a total area of the image 300 (e.g., 60% confluence).

The elements of the image processing technique 302 of FIG. 3 may vary without significantly departing from the presently disclosed techniques. In some example embodiments, one or more of the elements of the image processing technique 302 of FIG. 3 may be combined (e.g., the morphological operation 314 and the inversion 318 may be performed concurrently, as a single step). In some example embodiments, one or more of the elements of the image processing technique 302 of FIG. 3 may be partitioned into two or more discrete elements (e.g., performing a first morphological operation 314, such as an open operation, and then performing a second morphological operation 314 in series, such as a close operation).

In some example embodiments, one or more of the elements of the image processing technique 302 of FIG. 3 may be performed conditionally (e.g., applying an open morphological operation 314 only on condition that edges of the visual features of the first segmentation mask 312 are above a roughness threshold). In some example embodiments, one or more of the elements of the image processing technique 302 of FIG. 3 may be duplicated (e.g., applying the same, similar, and/or different morphological operations 314 on the second segmentation mask 324 after the second segmentation 322 as well as on the first segmentation mask 312 after the first segmentation 310) or presented in a different arrangement (e.g., performing one or more of the one or more morphological operations 314 concurrently with the first segmentation 310, and/or after the second segmentation 322). Many such variations of the elements of the image processing technique 302 of FIG. 3 will be appreciated by those of ordinary skill in the art that may include the features of the techniques disclosed herein.

C. Experimental Results

Figure 14:
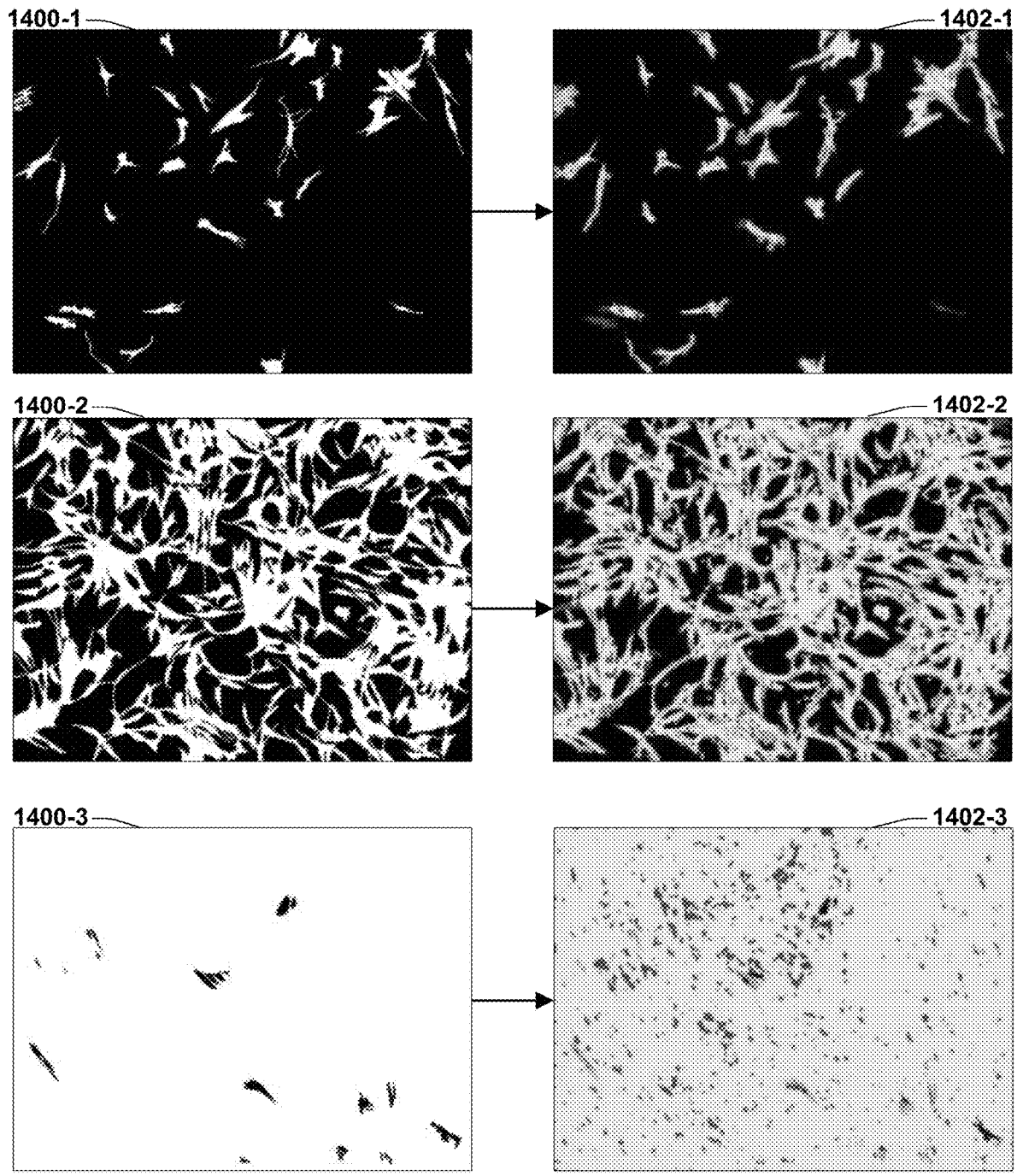
FIG. 14 is an illustration of a set of images produced by applying the image processing techniques to cell cultures in accordance with some example embodiments.

FIG. 14 is an illustration of a set of images produced by applying the image processing techniques to cell cultures in accordance with some example embodiments.

As shown in FIG. 14, a low-confluence image, labeled by an expert human labeler, is provided as a first "ground-truth" image 1400-1 of a low-confluence cell culture, resulting in a 5.93% confluence estimate. A first masked input image is generated by the techniques presented herein, resulting in an 8.33% confluence estimate. A first comparison 1402-1 of the first masked input image and the first "ground-truth" image 1400-1 is shown with true positive cells shown in yellow, false positive cells shown in green, false negative cells shown in red, and true negative areas of the image shown in black.

As further shown in FIG. 14, a medium-confluence image, labeled by an expert human labeler, is provided as a second "ground-truth" image 1400-2 of a medium-confluence cell culture, resulting in a 48.94% confluence estimate. A second masked input image is generated by the techniques presented herein, resulting in an 60.47% confluence estimate. A second comparison 1402-2 of the first masked input image and the first "ground-truth" image 1400-2 is shown with true positive cells shown in yellow, false positive cells shown in green, false negative cells shown in red, and true negative areas of the image shown in black.

As further shown in FIG. 14, a high-confluence image, labeled by an expert human labeler, is provided as a third "ground-truth" image 1400-3 of a high-confluence cell culture, resulting in a 99.22% confluence estimate. A third masked input image is generated by the techniques presented herein, resulting in a 95.08% confluence estimate. A third comparison 1402-3 of the third masked input image and the third "ground-truth" image 1400-3 is shown with true positive cells shown in yellow, false positive cells shown in green, false negative cells shown in red, and true negative areas of the image shown in black.

As can be seen in the comparisons 1400-1, 1400-2, 1400-3 of FIG. 14, the high proportion of yellow (true positive) and black (true negative) areas indicates strong correspondence between the ground-truth images and the masked input images produced by the techniques presented herein. In particular, the high correspondence in the third comparison 1402-3 and the concordance of the confluence estimates produced by the high-confluence expert human labeler and the masked input image demonstrates a coverage accuracy estimation with a high degree of accuracy even for very high-confluence images.

D. Example Embodiments

Figure 15:
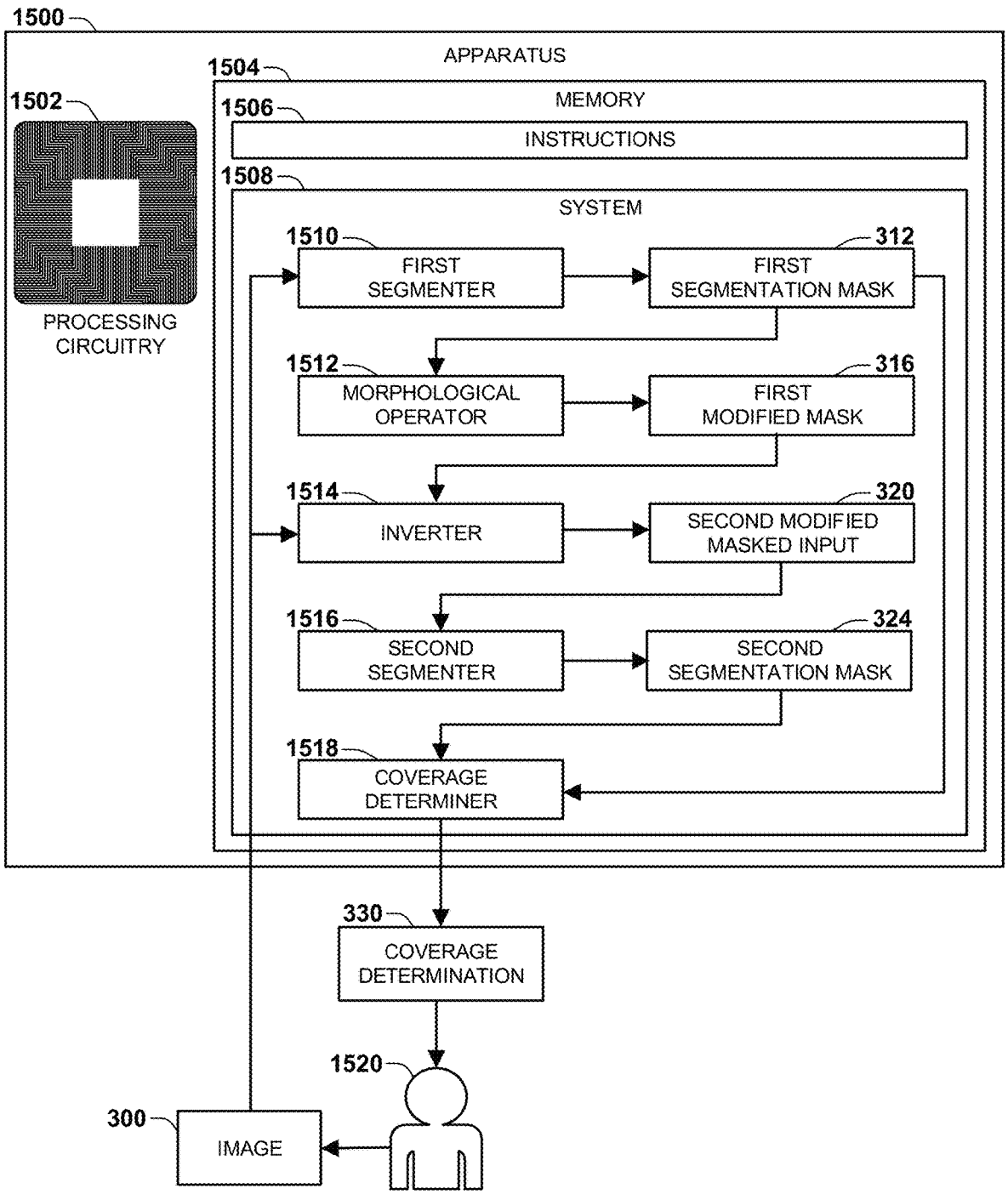
FIG. 15 is a component block diagram of an example apparatus, in accordance with some example embodiments.

FIG. 15 is a component block diagram of an example apparatus, in accordance with some example embodiments.

As shown in FIG. 15, some example apparatuses 1500 may include processing circuitry 1502 and a memory 1504. The memory 1504 may store instructions 1506 that, when executed by the processing circuitry 1502, cause the example apparatus 1500 to determine a coverage of an image 300. In some example embodiments, execution of the instructions 1506 may cause the example apparatus 1500 to instantiate and/or use a set of components of a system 1508. While FIG. 15 illustrates one such system 1508, some example embodiments may embody any of the methods disclosed herein.

The image 300 may be provided by an individual 1520 such as a user of the example apparatus 1500. The individual 1520 may obtain the image 300 from another system or may direct an image acquisition system to obtain the image 300 and provide the image 300 to the apparatus 1500. In various embodiments, the apparatus 1500 may include some or all of the image acquisition system. The image acquisition system may include a set of lights, a set of lenses, and a set of image sensors that offer manual and/or automatic control. For example, lighting may be determined automatically using a light meter, and image focus may be set automatically using an autofocus system. Acquisition of the image may also be automated, such as being performed at scheduled intervals. The intervals may be dynamic based on observed coverage of the subject—for example, when coverage is increasing slowly, the intervals may be increased. Additionally or alternatively, as the measured coverage approaches a desired coverage, the intervals may be decreased.

The example system 1508 of FIG. 15 includes a first segmenter 1510 that generates a first segmentation mask 312 by segmenting the image 300. Examples of such first segmentation are shown, for example, in FIGS. 6 and 7.

The example system 1508 of FIG. 15 includes a morphological operator 1512 that generates a first modified mask 316 by applying a morphological operation 314 to the first segmentation mask 312. Examples of such morphological operations 314 are shown, for example, in FIG. 8.

The example system 1508 of FIG. 15 includes an inverter 1514 that generates a second modified masked input 320 based on the image 300 and an inversion of the first modified mask 316. Examples of such second modified masked input generation are shown, for example, in FIG. 9.

The example system 1508 of FIG. 15 includes a second segmenter 1516 that generate a second segmentation mask 324 by segmenting the second modified masked input 320. Examples of such second segmentation are shown, for example, in FIGS. 10 and 11.

The example system 1508 of FIG. 15 includes a coverage determiner 1518 that determines a coverage of the image 300 based on the first segmentation mask 312 and the second segmentation mask 324.

As shown in FIG. 15, some example apparatuses 1500 may include processing circuitry 1502 that is capable of executing instructions. The processing circuitry 1502 may include, such as hardware including logic circuits; a hardware/software combination, such as a processor executing software; or a combination thereof. For example, a processor may include, but is not limited to, a central processing unit (CPU), a graphics processing unit (GPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As further shown in FIG. 15, some example apparatuses 1500 may include a memory 1504 storing instructions 1506. The memory 1504 may include, for example, random-access memory (RAM), read-only memory (ROM), an erasable programmable read-only memory (EPROM), an electrically erasable programmable read-only memory (EEPROM), etc. The memory 1504 may be volatile, such as system memory, and/or nonvolatile, such as a hard disk drive, a solid-state storage device, flash memory, or magnetic tape. The instructions 1506 stored in the memory 1504 may be specified according to a native instruction set architecture of a processor, such as a variant of the IA-32 instruction set architecture or a variant of the ARM instruction set architecture, as assembly and/or machine-language (e.g., binary) instructions; instructions of a high-level imperative and/or declarative language that is compilable and/or interpretable to be executed on a processor; and/or instructions that are compilable and/or interpretable to be executed by a virtual processor of a virtual machine, such as a web browser. A set of non-limiting examples of such high-level languages may include, for example: C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Swift, Eiffel, Smalltalk, Erlang, Ruby, Flash®, Visual Basic®, Lua, MATLAB, SIMULINK, and Python®. Such instructions 1506 may also include instructions for a library, resource, platform, application programming interface (API), or the like that is utilized in determining a clinical value (such as a prognosis) for an individual based on a tumor shown in an image.

As shown in FIG. 15, some example systems 1508 may be organized in a particular manner, for example, to allocate some functionality to each component of a system. Some example embodiments may implement each such component in various ways, such as software, hardware (e.g., processing circuitry), or a combination thereof. In some example embodiments, the organization of the system may vary as compared with some other example embodiments, including the example system 1508 shown in FIG. 15. For example, some example embodiments may include a system featuring a different organization of components, such as renaming, rearranging, adding, partitioning, duplicating, merging, and/or removing components, sets of components, and relationships thereamong, without departing from the scope of the present disclosure. All such variations that are reasonably technically and logically possible, and that are not contradictory with other statements, are intended to be included in this disclosure, the scope of which is to be understood as being limited only by the claims.

Figure 16:
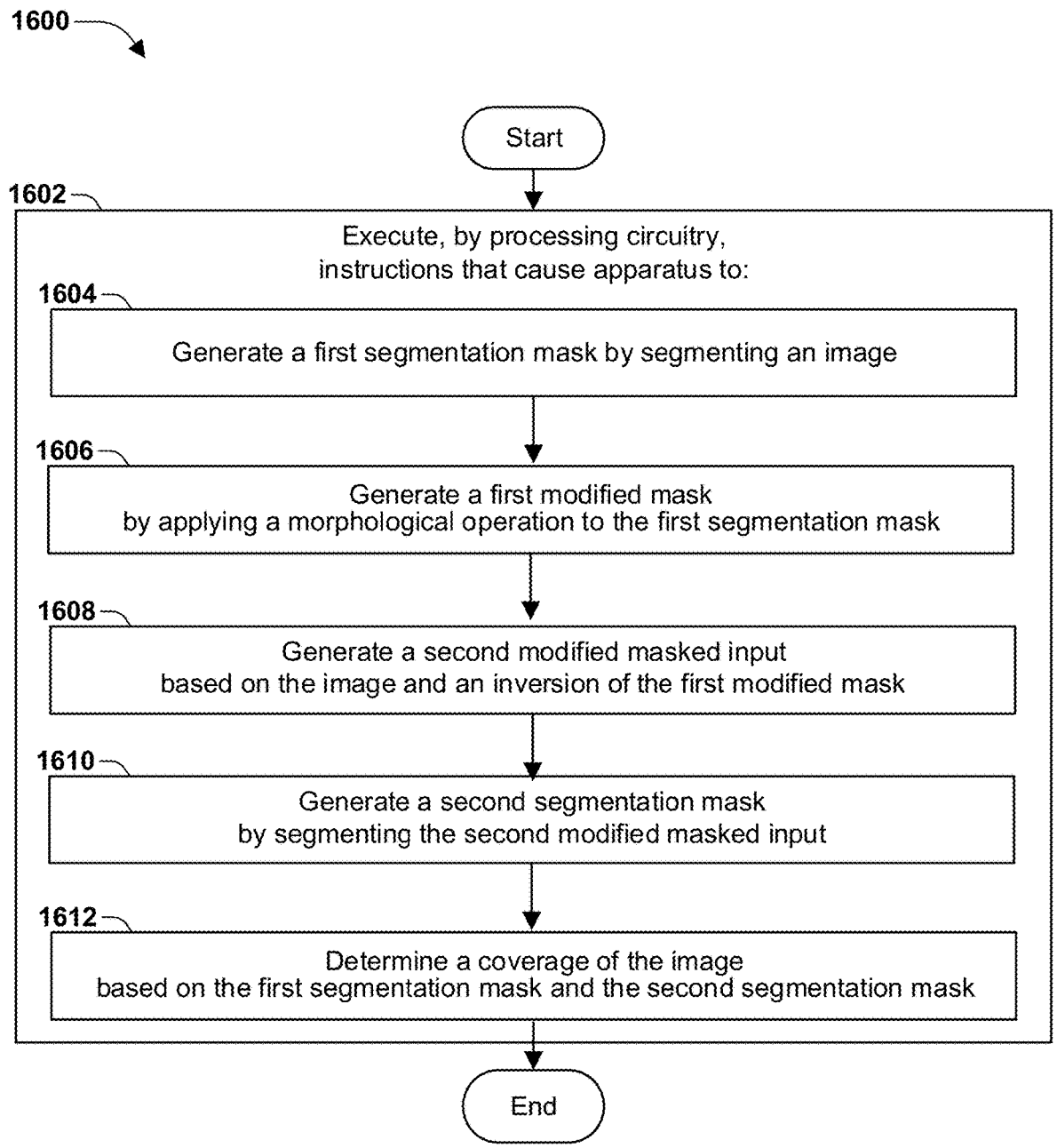
FIG. 16 is a flow diagram of an example method 1600, in accordance with some example embodiments.

FIG. 16 is a flow diagram of an example method 1600, in accordance with some example embodiments.

The example method 1600 may be implemented, for example, as a set of instructions that, when executed by processing circuitry of an apparatus, cause the apparatus to perform each of the elements of the example method 1600. The example method 1600 may also be implemented, for example, as a set of instructions that, when executed by processing circuitry of an apparatus, cause the apparatus to provide a system of components, such as a first segmenter, a morphological operator, an inverter, a second segmenter, and a coverage determiner.

The example method 1600 includes executing 1602, by processing circuitry of an apparatus, instructions that cause the apparatus to perform a set of elements. For example, the execution of the instructions may cause the apparatus to generate 1604 a first segmentation mask 312 by segmenting an image 300. The execution of the instructions may cause the apparatus to generate 1606 a first modified mask 316 by applying a morphological operation 314 to the first segmentation mask 312. The execution of the instructions may cause the apparatus to generate 1608 a second modified masked input 320 based on the image 300 and an inversion 318 of the first modified mask 316. The execution of the instructions may cause the apparatus to generate 1610 a second segmentation mask 324 by segmenting the second modified masked input 320. The execution of the instructions may cause the apparatus to determine 1612 a coverage determination 330 of the image 300 based on the first segmentation mask 312 and the second segmentation mask 324. In this manner, the execution of the instructions by the processing circuitry may cause the apparatus to perform the elements of the example method 1600, and so the example method 1600 ends.

Figure 17:
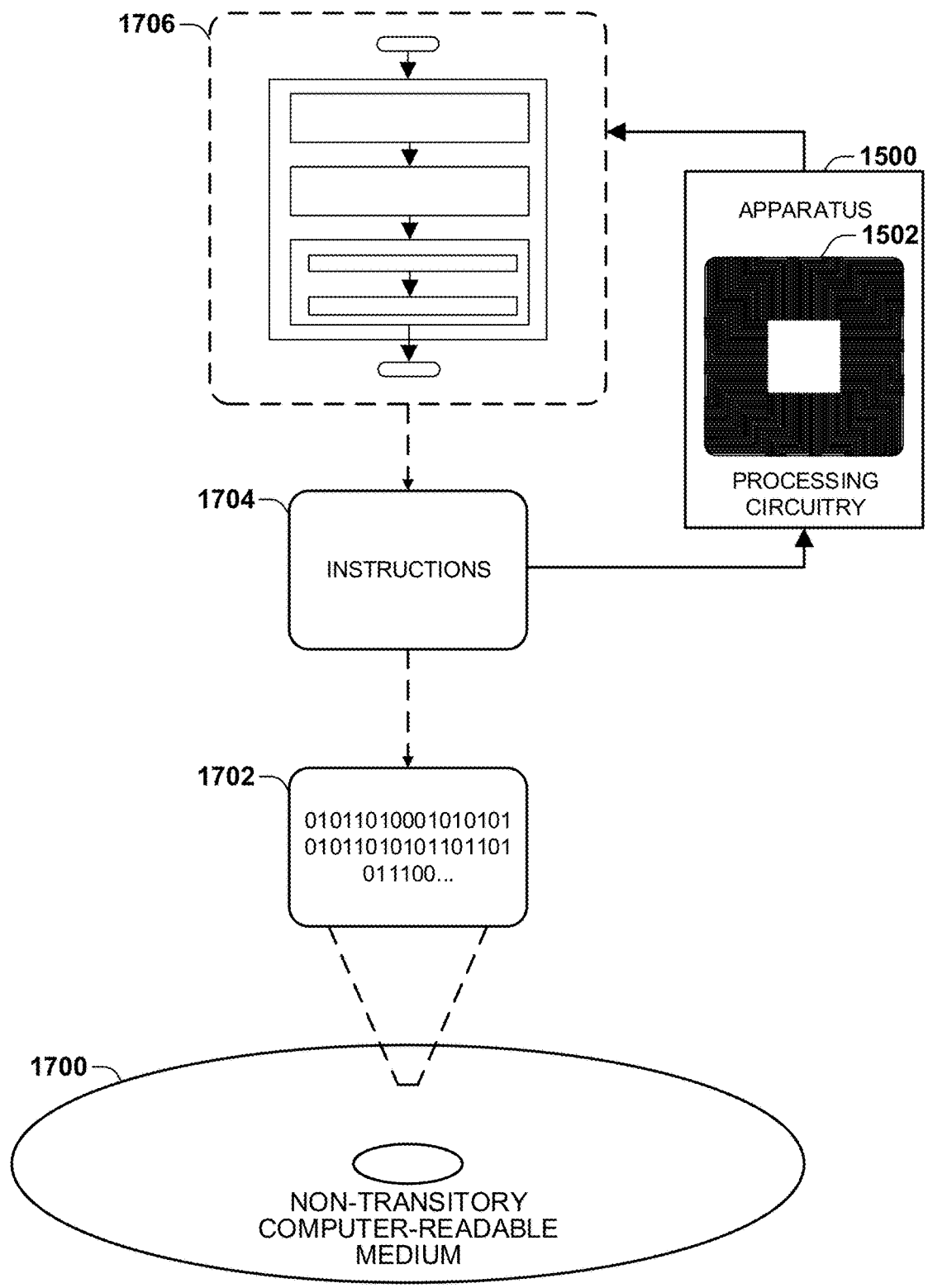
FIG. 17 is an illustration of an example non-transitory computer-readable medium 1700, in accordance with some example embodiments.

FIG. 17 is an illustration of an example computer-readable medium 1700, in accordance with some example embodiments.

As shown in FIG. 17, the non-transitory computer-readable medium 1700 may store binary data 1702 encoding a set of instructions 1704 that, when executed by processing circuitry 1502 of an example apparatus 1500, cause the example apparatus 1500 to perform operations 1706, including determining a coverage determination 330 of an image 300. As a first such example, the instructions 1704 may encode the components of the example apparatus 1500 of FIG. 15. As a second such example, the instructions 1704 may encode the components of the example system 1508 of FIG. 15. As a third such example, the instructions 1704 may encode the elements of an example method, such as the example method 1600 of FIG. 16.

In some example embodiments, a system may include image evaluating means for determining a coverage of an image 300. The system may include a first segmenting means for generating a first segmentation mask 312 by segmenting the image 300; a first modified mask generating means for generating a first modified mask 316 by applying a morphological operation to the first segmentation mask 312; a second modified masked input generating means for generating a second modified masked input 320 based on the image 300 and an inversion 318 of the first modified mask 316; a second segmenting means for generating a second segmentation mask 324 by segmenting the second modified masked input 320; and a determining means for determining the coverage determination 330 of the image 300 based on the first segmentation mask 312 and the second segmentation mask 324.

E. Technical Effects

Some example embodiments of the present disclosure may present one or more technical effects.

As a first such example, some example embodiments may enable a processing of images 300, such as images of cell cultures, in a manner that is faster and/or more efficient than other techniques, including examination by an expert human labeler. For example, components of one or more example embodiments may be implemented in concurrent, distributed, streaming, and/or pipelined architectures, such that images 300 may be processed rapidly. As an example, due to such rapid evaluation of the images 300, cell cultures in a research environment may be timely evaluated for a cell culture population and/or may promptly present coverage determinations, such that the cells in a cell culture may be subjected to further research promptly upon determining that the cells have reached a selected stage of maturation indicated by the research.

As a second such example, some example embodiments may enable a processing of images 300, such as images of cell cultures, in a manner that is more consistent than other techniques, including examination by an expert human labeler. For example, by avoiding determinations based on the judgment of a team of expert human labelers who may have different standards of coverage or confluence, and/or different accuracy rates in evaluating images, some example embodiments of the presented techniques may be capable of applying more consistent standards to a set of images, resulting in more consistent coverage evaluations. Further, some example embodiments of the presented techniques may exhibit less variance over time, as may be exhibited by the judgment of an expert human labeler over time, which may result in less variance in the coverage determinations of similar images 300 over time.

As a third such example, some example embodiments may enable a processing of images 300, such as images of cell cultures, in a manner that is more accurate than other techniques, including examination by an expert human labeler. For example, in high-confluence images of cell cultures in particular, distinguishing between cells, or between cells and non-cell matter, may be difficult in dense areas of an image 300. Many techniques, including some expert human labelers, may underestimate the coverage determinations of images 300 due to such difficulty, such as shown in FIG. 2. By contrast, as shown in the techniques presented herein (such as in FIG. 14), some example embodiments may exhibit a high degree of correspondence between coverage determinations and matching labeled ground-truth images 300. Many such technical effects may be exhibited by some example embodiments.

F. Example Computing Environment

Figure 18:
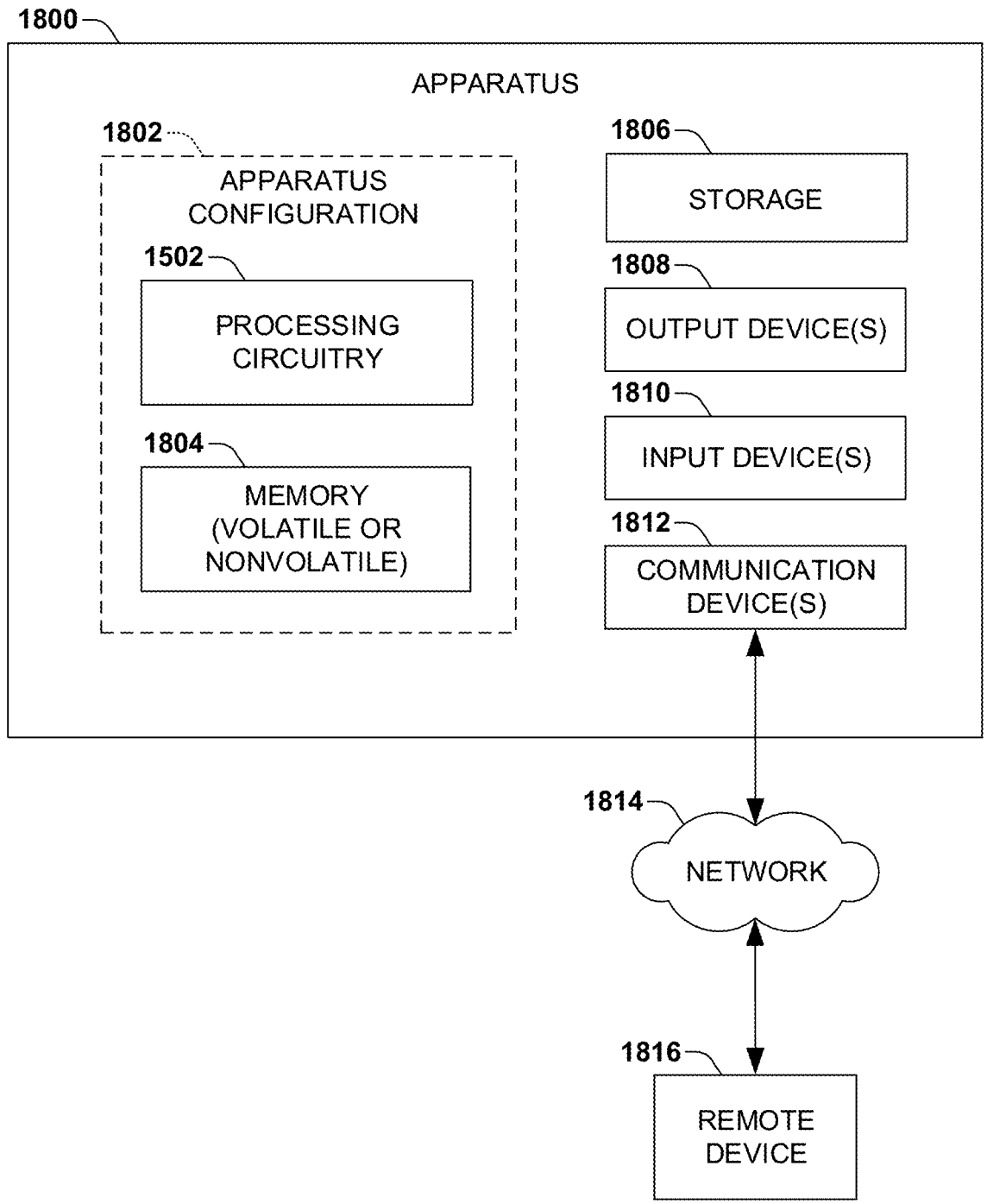
FIG. 18 is an illustration of an example apparatus in which some example embodiments may be implemented.

FIG. 18 is an illustration of an example apparatus in which some example embodiments may be implemented.

FIG. 18 and the following discussion provide a brief, general description of a suitable computing environment to implement embodiments of one or more of the provisions set forth herein. The operating environment of FIG. 18 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, media devices such as televisions, consumer electronics, embedded devices, mini computers, mainframe computers, distributed computing environments that include any of the above systems or devices, wearable computing devices (such as glasses, earpieces, wristwatches, rings, pendants, handheld and/or body-mounted cameras, clothing-integrated devices, and implantable devices), autonomous vehicles, extended reality (XR) devices such as augmented reality (AR) and/or virtual reality (VR) devices, internet-of-things (IoT) devices, and the like.

Some example embodiments may include a combination of components of the same and/or different types, such as a plurality of processors and/or processing cores in a uniprocessor or multi-processor computer; two or more processors operating in tandem, such as a CPU and a GPU; a CPU utilizing an ASIC; and/or software executed by processing circuitry. Some example embodiments may include components of a single device, such a computer including one or more CPUs that store, access, and manage the cache. Some example embodiments may include components of multiple devices, such as two or more devices having CPUs that communicate to access and/or manage a cache. Some example embodiments may include one or more components that are included in a server computing device, a server computer, a series of server computers, server farm, a cloud computer, a content platform, a mobile computing device, a smartphone, a tablet, or a set-top box. Some example embodiments may include components that communicate directly (e.g., two or more cores of a multi-core processor) and/or indirectly (e.g., via a bus, via over a wired or wireless channel or network, and/or via an intermediate component such as a microcontroller or arbiter). Some example embodiments may include multiple instances of systems or instances that are respectively performed by a device or component, where such systems instances may execute concurrently, consecutively, and/or in an interleaved manner. Some example embodiments may feature a distribution of an instance or system over two or more devices or components.

Although not required, some example embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 18 illustrates an example of an example apparatus 1800 configured as, or to include, one or more example embodiments, such as the example embodiments provided herein. In one apparatus configuration 1802, the example apparatus 1800 may include processing circuitry 1502 and memory 1804. Depending on the exact configuration and type of computing device, memory 1804 may be volatile (such as RAM, for example), nonvolatile (such as ROM, flash memory, etc., for example) or some combination of the two.

In some example embodiments, an example apparatus 1800 may include additional features and/or functionality. For example, an example apparatus 1800 may also include additional storage (e.g., removable and/or non-removable) including, but not limited to, magnetic storage, optical storage, and the like. Such additional storage is illustrated in FIG. 18 by storage 1806. In some example embodiments, computer-readable instructions to implement one or more embodiments provided herein may be stored in the memory 1804 and/or the storage 1806.

In some example embodiments, the storage 1806 may be configured to store other computer readable instructions to implement an operating system, an application program, and the like. Computer-readable instructions may be loaded in memory 1804 for execution by processing circuitry 1502, for example. Storage may include volatile and nonvolatile, removable and non-removable media implemented in any method or technology for storage of information such as computer readable instructions or other data. Storage may include, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which can be accessed by example apparatus 1800. Any such computer storage media may be part of example apparatus 1800.

In some example embodiments, an example apparatus 1800 may include input device(s) 1810 such as keyboard, mouse, pen, voice input device, touch input device, infrared cameras, video input devices, and/or any other input device. Output device(s) 1808 such as one or more displays, speakers, printers, and/or any other output device may also be included in example apparatus 1800. Input device(s) 1810 and output device(s) 1808 may be connected to example apparatus 1800 via a wired connection, wireless connection, or any combination thereof. In some example embodiments, an input device or an output device from another computing device may be used as input device(s) 1810 or output device(s) 1808 for example apparatus 1800.

In some example embodiments, an example apparatus 1800 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In other example embodiments, components of an example apparatus 1800 may be interconnected by a network. For example, memory 1804 may include multiple physical memory units located in different physical locations interconnected by a network.

In some example embodiments, an example apparatus 1800 may include one or more communication device(s) 1812 by which the example apparatus 1800 may communicate with other devices. Communication device(s) 1812 may include, for example, a modem, a Network Interface Card (NIC), an integrated network interface, a radio frequency transmitter/receiver, an infrared port, a USB connection, or other interfaces for connecting the example apparatus 1800 to other computing devices, including remote devices 1816. Communication device(s) 1812 may include a wired connection or a wireless connection. Communication device(s) 1812 may be configured to transmit and/or receive communication media.

Those skilled in the art will realize that storage devices used to store computer readable instructions may be distributed across a network. For example, an example apparatus 1800 may communicate with a remote device 1816 via a network 1814 to store and/or retrieve computer-readable instructions to implement one or more example embodiments provided herein. For example, an example apparatus 1800 may be configured to access a remote device 1816 to download a part or all of the computer-readable instructions for execution. Alternatively, an example apparatus 1800 may be configured to download portions of the computer-readable instructions as needed, wherein some instructions may be executed at or by the example apparatus 1800 and some other instructions may be executed at or by the remote device 1816.

In this application, including the definitions below, the term "module" or the term "controller" may be replaced with the term "circuit." The term "module" may refer to, be part of, or include processing circuitry 1502 (shared, dedicated, or group) that executes code and memory circuitry/hardware (shared, dedicated, or group) that stores code executed by the processing circuitry 1502.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processing circuitry 1502 may encompass a single microprocessor that executes some or all code from multiple modules. Group processing circuitry 1502 may encompass a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The example embodiments of apparatuses and methods described herein may be partially or fully implemented by a special-purpose computer created by configuring a general-purpose computer to execute one or more particular functions embodied in computer programs. The functional blocks and flowchart elements described herein may serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

G. Use of Terms

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any other example embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "component," "module," "system," "interface," and the like are generally intended to refer to a computer-related entity, either hardware, a combination of hardware and software, software, software suite, or software in execution. For example, a component may be, but is not limited to being, a process running on processing circuitry 1502, processing circuitry 1502, an object, an executable, a thread of execution, a program, and/or a computer. By way of illustration, both an application running on a controller and the controller can be a component. One or more components may reside within a process and/or thread of execution and a component may be localized on one computer and/or distributed between or among two or more computers.

Furthermore, some example embodiments may include a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In some example embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each example embodiment provided herein.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. The articles "a" and "an" as used herein and in the appended claims may generally be construed to mean "one or more" unless specified otherwise or clear from context to be directed to a singular form.

Although the disclosure has been shown and described with respect to some example embodiments, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated some example embodiments of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A method of operating an apparatus including processing circuitry, the method comprising:
  executing, by the processing circuitry, instructions that cause the apparatus to:
  1) generate a first segmentation mask by segmenting an image, generate a modified mask by applying a morphological operation to the first segmentation mask, generate a modified masked input based on the image and an inversion of the modified mask, and generate a second segmentation mask by segmenting the modified masked input;
  2) combine the first segmentation mask and the second segmentation mask to generate a composite mask, wherein generating the composite mask includes applying a non-cell filter to the composite mask to exclude non-cell areas of the composite mask, and wherein excluding the non-cell areas of the composite mask is based on at least one of a morphology of the non-cell areas and a size of the non-cell areas; and 3) determine a coverage of the image based on the first segmentation mask and the second segmentation mask, wherein determining the coverage of the image includes a) presenting the image masked by the composite mask as an illustration of the coverage of the image and b) estimating a coverage of the composite mask.

2. The method of claim 1, wherein
executing the instructions further causes the apparatus to adjust a feature of the image to generate an adjusted image, and
generating the first segmentation mask includes segmenting the adjusted image.

3. The method of claim 2, wherein adjusting the feature of the image includes normalizing an illumination level of the image.

4. The method of claim 3, wherein normalizing the illumination level of the image includes applying a Gaussian blur to the image to produce a blurred image and subtracting the blurred image from the image.

5. The method of claim 2, wherein adjusting the feature of the image includes increasing a local contrast level of the image.

6. The method of claim 5, wherein increasing the local contrast level of the image includes applying a contrast-limited adaptive histogram equalization to the image.

7. The method of claim 1, wherein generating the first segmentation mask includes segmenting the image based on an edge filter.

8. The method of claim 1, wherein generating the first segmentation mask includes applying a Gaussian blur to the image.

9. The method of claim 1, wherein generating the first segmentation mask includes increasing a contrast level of the image.

10. The method of claim 1, wherein the morphological operation includes at least one of:
an open morphological operation,
a close morphological operation,
a dilation morphological operation, and
an erosion morphological operation.

11. The method of claim 1, wherein segmenting the modified masked input includes segmenting the modified masked input based on an edge filter.

12. The method of claim 1, wherein segmenting the modified masked input includes applying a Gaussian blur to the modified masked input.

13. The method of claim 1, wherein segmenting the modified masked input includes increasing a contrast level of the modified masked input.

* * * * *